United States Patent

Kishi et al.

[11] Patent Number: 6,007,643
[45] Date of Patent: Dec. 28, 1999

[54] METHOD OF MANUFACTURING MAGNETORESISTIVE HEAD

[75] Inventors: Hitoshi Kishi; Kazuo Kobayashi; Atsushi Tanaka; Yasuhiro Kitade; Yuko Miyake; Mitsuru Otagiri, all of Kanagawa, Japan

[73] Assignee: Fujitsu Limited, Kawasaki, Japan

[21] Appl. No.: 08/920,811

[22] Filed: Aug. 29, 1997

Related U.S. Application Data

[62] Division of application No. 08/677,612, Jul. 9, 1996, Pat. No. 5,729,411.

[30] Foreign Application Priority Data

Jul. 12, 1995 [JP] Japan ................................. 7-176425
Mar. 28, 1996 [JP] Japan ................................. 8-73782

[51] Int. Cl.$^6$ .................................................. H01F 1/147
[52] U.S. Cl. ................................. 148/121; 29/603.08
[58] Field of Search .................................. 148/102, 103, 148/108, 121, 122; 29/603.08

[56] References Cited

U.S. PATENT DOCUMENTS

| | | |
|---|---|---|
| 3,607,460 | 9/1971 | Lommel ................................. 148/108 |
| 4,755,897 | 7/1988 | Howard . |
| 5,315,468 | 5/1994 | Lin et al. . |
| 5,552,949 | 9/1996 | Hashimoto et al. . |

FOREIGN PATENT DOCUMENTS

| | | |
|---|---|---|
| 4162207 | 6/1992 | Japan . |
| 4211106 | 8/1992 | Japan . |
| 6314617 | 11/1994 | Japan . |

Primary Examiner—John Sheehan
Attorney, Agent, or Firm—Greer, Burns & Crain, Ltd.

[57] ABSTRACT

A magnetoresistive head in which an antiferromagnetic material having superior corrosion resistance is used is disclosed. In the magnetoresistive head, a pair of antiferromagnetic layers 24a and 24b are formed while contacting with a soft magnetic layer 23, and the antiferromagnetic layers 24a and 24b are made of a PdMn film.

15 Claims, 16 Drawing Sheets

Measurement result of anodic polarization curve of various kinds of films

Layered configuration : Si/Ta(5)/NiFe(9)/Cu(4)/NiFe(4)/FeMn(19)/Ta(10)
(unit : nm)

Layered configuration : Si/Ta(30)/NiFe(20)/NiMn(25)/Ta(10)
(unit : nm)

METHOD OF MANUFACTURING MAGNETORESISTIVE HEAD

This application is a divisional of application number 08/677,612 filed on Jul. 9, 1996 now U.S. Pat. No. 5,729,411.

BACKGROUND OF THE INVENTION

1. Field of the Invention

The present invention relates generally to a magnetoresistive head and a magnetic recording/reproducing drive, and more particularly to a magnetoresistive head and a magnetic recording/reproducing drive made of an antiferromagnetic material having a high corrosion resistance.

2. Description of the Prior Art

A magnetic thin film such as NiFe has been conventionally used as a material of anisotropic magnetoresistive film (AMR film) for a magnetic sensor or a magnetic head. The AMR film made of NiFe originally has a structure with a plurality of magnetic domains. Therefore, in cases where the AMR film made of NiFe is used as a magnetoresistive head, a Barkhausen effect is induced in the magnetoresistive head. To avoid the Barkhausen effect, it is, for example, required to apply a bias magnetic field to the AMR film in a direction of easy magnetization for the purpose of controlling the magnetic domains to change the magnetic domains to a single magnetic domain.

As one method for changing the magnetic domains to a single magnetic domain, an exchanging bias method in which two antiferromagnetic layers 4a and 4b made of an FeMn alloy or an FeMnCr alloy (refer to U.S. Pat. No. 4,755,897) and an FeMnIr alloy (refer to Published Unexamined Japanese Patent Application (KOKAI) 4-162207) or another FeMn-X alloy (refer to Published Unexamined Japanese Patent Application (KOKAI) 4-211106) are used is disclosed. As shown in FIG. 1, the antiferromagnetic layers 4a and 4b are formed on both ends of a surface of an NiFe film 3 which functions as an anisotropic magnetoresistive film. A region between the both ends is to be a sense region SA. Surfaces of the layers 4a and 4b are in contact with the surface of the NiFe film 3 to set a group of antiferromagnetic layers 4a and 4b and the NiFe film 3 in an exchanging coupling condition. The magnetization of the NiFe film 3 is oriented in a single direction by using the exchanging coupling. In this case, as shown in FIG. 1, the NiFe film 3 is formed on a ground layer 2 which is made of a nonmagnetic metal and is formed on a substrate 1. A pair of electrodes 5a and 5b for leading a sense current to a magnetoresistive head are formed on the antiferromagnetic layers, 4a and 4b (or FeMn films 4a and 4b).

Also, because the sensitivity of the magnetic sensor and the magnetic head has been recently heightened, a giant magnetoresistive film (GMR film) is watched to obtain a higher output power. In particular, as shown in FIG. 2, a spin valve magnetoresistive film has been recently watched because the spin valve magnetoresistive film can be comparatively easily produced, and a changing rate of an electric resistance in the spin valve magnetoresistive film is high in case of a low magnetic field. In the spin valve magnetoresistive film, an angle between magnetizing directions of two magnetic thin films changes with the intensity of a magnetic field applied to the spin valve magnetoresistive film, and the electric resistance changes with the angle. A phenomenon that the electric resistance changes with the angle is called a spin valve effect.

As a magnetoresistive (MR) head is shown in FIG. 2, two soft magnetic thin films such as NiFe films 13 and 15 are used as two magnetic thin-film layers, and an antiferromagnetic layer 16 made of an FeMn alloy is formed on a first soft magnetic layer 15. Also, a second soft magnetic layer 13 and the first soft magnetic layer 15 are laminated with a non-magnetic metal layer 14 therebetween. Also, the second soft magnetic layer 13 is arranged on a ground layer 12 which is arranged on a substrate 11, and a pair of electrodes 17a and 17b for leading a sense current to the MR head are formed on the antiferromagnetic layer 16.

A bias magnetic field Hua of the antiferromagnetic layer 16 is applied to the first soft magnetic layer 15 to fix a magnetizing direction of the first soft magnetic layer 15. A magnetizing direction of the second soft magnetic layer 13 is rotated with a signal magnetic field. Because of the rotation of the magnetizing direction of the second soft magnetic layer 13, an angle $\Theta$ between the magnetizing directions of the first and second soft magnetic layers 13 and 15 changes. A whole resistance of the MR head changes in proportion to a cosine of the angle $\Theta(\cos \Theta)$. In this case, a sense current is supplied to the MR head through the electrodes 17a and 17b. The change of a voltage between the electrodes 17a and 17b is detected to obtain the whole resistance.

However, because corrosion resistance of the antiferromagnetic layer 16 (or FeMn film 16) is low, the yield rate of the MR head is lowered, the number of manufacturing steps increases, and the reliability for the MR head is lowered.

To avoid the above drawbacks, it is disclosed in U.S. Pat. No. 5,315,468 that an NiMn alloy is used as the antiferromagnetic layer in place of the FeMn alloy. However, a heating process for the NiMn film is required to obtain the bias magnetic field, with a heating temperature of no less than 260° C. Therefore, in case of a spin valve film or an artificial lattice film, where an NiFe film is used as the soft magnetic layer to obtain a comparatively high magnetoresistive effect and Cu is used as the nonmagnetic metal layer, Cu is diffused into and mixed in the NiFe film to degrade a magnetic resistance property thereof. Therefore, there is a drawback that a desired magnetoresistive effect cannot be obtained.

Also, the use of a PdPtMn alloy as an antiferromagnetic substance is disclosed in Published Unexamined Japanese Patent Application (KOKAI) 6-314617. However, an intensity of the bias magnetic field obtained by the use of the PdPtMn alloy becomes very low.

SUMMARY OF THE INVENTION

An object of the present invention is to provide, with due consideration to the drawbacks of such a conventional magnetoresistive head and a conventional magnetic recording drive, a magnetoresistive head and a magnetic recording drive in which an anti-ferromagnetic layer made of a material having a high corrosion resistance is arranged and the material is changed to that having an antiferromagnetic property by heating the material at a low temperature.

To find out a magnetic material which has a high corrosion resistance and is changed to that having an anti-ferromagnetic property by heating the material at a low temperature, many experiments have been performed by the inventors of the present application, and results were obtained as follows.

FIG. 3(a) is a characteristic view indicating an anodic polarization curve obtained from an experiment for corrosion resistance.

Because corrosion resistance becomes heightened as the pitting potential (PP), which denotes an electric potential at a time that corrosion is started, and the natural potential, (RP) which indicates the degree of an ionization tendency, are both increasing together, as shown in FIG. 3(a), corrosion resistance of a PdMn alloy is very high as compared with that of the FeMn alloy and is almost the same as that of the NiMn alloy. Also, corrosion resistance of the PdPtMn alloy is higher than that of the PdMn alloy and is almost the same as that of the NiFe alloy or Au.

FIG. 4 is a characteristic view indicating the intensity of a bias magnetic field (Hua) of a PdMn film with respect to an atomic fraction of Mn on condition that a heating process is performed for an experimental sample including two laminated films of a soft magnetic layer made of an NiFe film and an antiferromagnetic layer made of a PdMn film which are in contact with each other.

As shown in FIG. 4, the bias magnetic field occurs at a comparatively low temperature of 220° C. for the heating process or a higher temperature at an Mn atomic fraction ranging from 50 to 54 at %, and the intensity of the bias magnetic field is maximized at an Mn atomic fraction of almost 53 at %. Therefore, even though the heating process is performed at a temperature of 220° C., a magnetic field having sufficient intensity is obtained as the bias magnetic field by adjusting a film thickness of the soft magnetic layer. In particular, in cases where Cu or the like is used as a nonmagnetic metal film, it is preferred that the heating process be performed at a temperature equal to or lower than 240° C. to suppress the diffusion of Cu into the soft magnetic layer. In contrast, in cases where Cu or the like is not used as a nonmagnetic metal film, the heating process performed at a temperature higher than 240° C. is allowable. For example, the Mn atomic fraction can be widened in a range from 48 to 56 at %.

FIG. 5 shows the change of the bias magnetic field with respect to heating process time for the above experimental sample by using a film thickness (t) of the soft magnetic layer making contact with the antiferromagnetic layer as a parameter.

As shown in FIG. 5, in cases where the film thickness of the soft magnetic layer is thinned and the heating process time is lengthened, the bias magnetic field having a higher intensity can be obtained. Accordingly, even though the intensity of the bias magnetic field is low in the above experimental sample, there is no problem in practice.

Also, though the PdPtMn alloy disclosed in the Published Unexamined Japanese Patent Application (KOKAI) 6-314617 has superior corrosion resistance, the intensity of the bias magnetic field becomes very low. The reason that the intensity of the bias magnetic field becomes very low is because no heating process is performed. Therefore, an experiment to give a ferromagnetic property to the PdPtMn alloy by thermally processing the PdPtMn alloy has been performed by the inventors of the present invention; The results of the experiment are described as follows.

FIG. 8 is a characteristic view showing the relationship between an atomic fraction of Mn included in the PdPtMn alloy and the bias magnetic field Hua by using the atomic fraction of Pt as a parameter on the condition that the heating process is performed for an experimental sample including two laminated films of a soft magnetic layer made of an NiFe film and an antiferromagnetic layer made of a PdMn film which are in contact with each other. FIG. 12 is a characteristic view showing the bias magnetic field Hua changing with the heating process temperature.

As shown in FIG. 8, the intensity of the bias magnetic field Hua greatly depends on the atomic fraction of Pt and the atomic-fraction of Mn, and the intensity of the bias magnetic field Hua is maximized at the Mn atomic fraction of almost 51 at % and at the Pt atomic fraction of almost 20 at %. Also, the bias magnetic field Hua having a high intensity as compared with that in the PdMn film is generated in the PdPtMn film at a comparatively low temperature of almost 230° C. In addition, as shown in FIG. 12, when the film thickness of the NiFe film is thinned, the bias magnetic field Hua having a high intensity is generated at a lower temperature of almost 170° C. or more.

FIG. 9 is a characteristic view showing a coercive force Hc changing with the atomic fraction of Pt and the atomic fraction of Mn in the above experimental sample.

As shown in FIG. 9, a changing degree of an intensity of a coercive force Hc with respect to the change of the Pt atomic fraction and the change of the Mn atomic fraction is lower than 20 oersteds, so that the changing degree of the intensity of the coercive force Hc is sufficiently low as compared with that of the intensity of the bias magnetic field Hua shown in FIG. 8.

FIG. 10 shows the bias magnetic field Hua changing with the heating process temperature in the above experimental sample, and FIG. 11 shows the coercive force Hc changing with the heating process temperature in the above experimental sample.

As shown in FIGS. 10 and 11, in cases where the heating process temperature is heightened, the bias magnetic field Hua having a higher intensity can be obtained while maintaining the coercive force Hc at a low intensity.

Therefore, because the antiferromagnetic property can be given to the PdMn alloy and the PdPtMn alloy, in cases where a Cu film is arranged in the magnetoresistive head as a nonmagnetic metal layer, the diffusion and mixing of Cu into the soft magnetic layer is prevented, and the deterioration of a film magnetoresistive property can be suppressed. Also, because the corrosion resistance of the PdMn alloy is superior to that of the FeMn alloy and the corrosion resistance of the PdPtMn alloy is superior to that of the PdMn alloy, in cases where the PdMn alloy and the PdPtMn alloy are used as the material of the anti-ferromagnetic layer, the reliability of the magnetoresistive head can be improved.

Also, because the magnetoresistive head is used in a magnetic recording drive according to the present invention, the deterioration of the magnetoresistive property can be suppressed, the corrosion resistance can be heightened, and the reliability can be improved.

DESCRIPTION OF THE PREFERRED EMBODIMENTS

Figure 1:
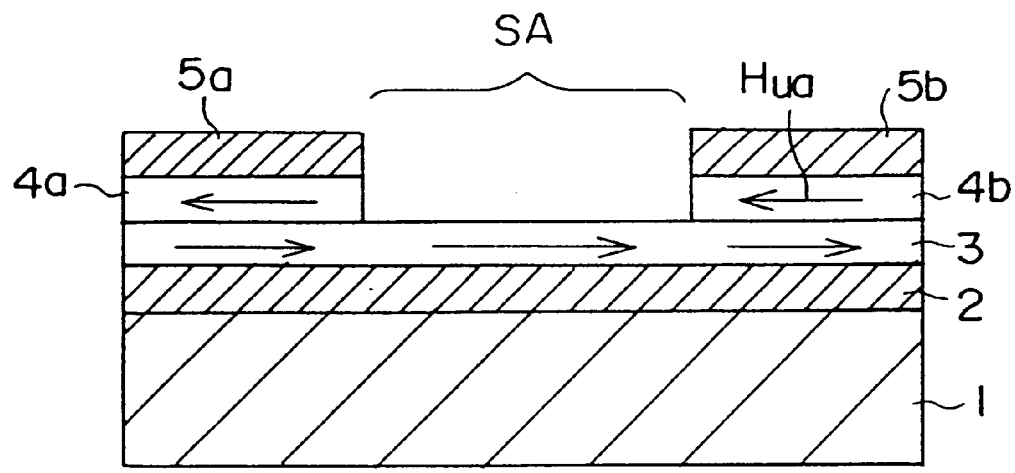
FIG. 1 is a cross-sectional view of a conventional magnetoresistive head using an anisotropic magnetoresistive effect.
Figure 2:
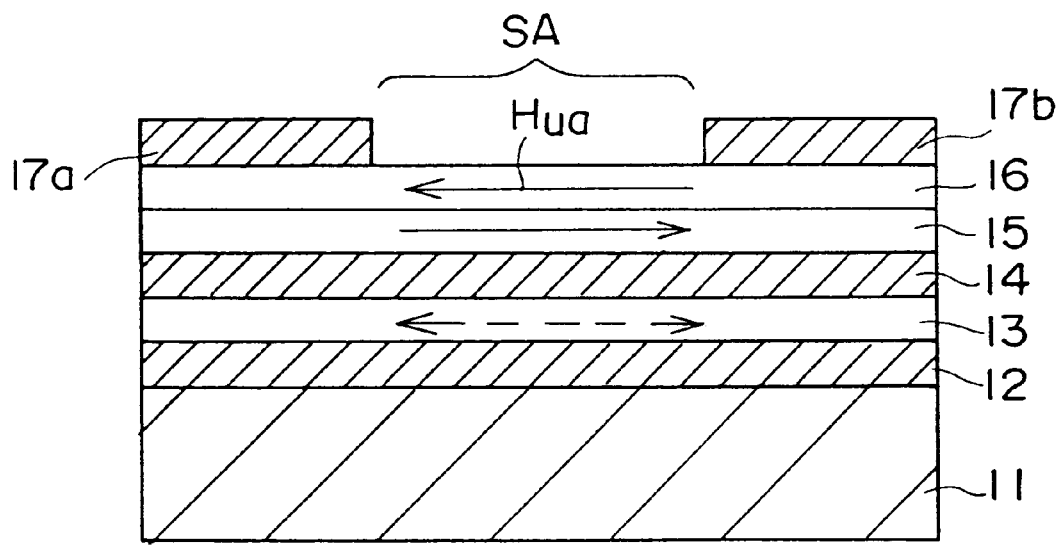
FIG. 2 is a cross-sectional view of another conventional magnetoresistive head using a spin valve magnetoresistive effect.

Preferred embodiments of a magnetoresistive head and a magnetic recording drive according to the present invention are described with reference to drawings.

(1) A first embodiment

An experiment on the corrosion resistance of an antiferromagnetic material and an experiment for giving an antiferromagnetic to a material in a heating process according to the first embodiment of the present invention are described hereinafter.

(a) An experiment on corrosion resistance

A principle of the corrosion resistance experiment is as follows. That is, the corrosion of metal in an aqueous solution occurs by ionizing the metal in the aqueous solution, reacting the ionized metal with a hydroxyl group OH and precipitating oxide on a surface of the metal. Therefore, an experimental sample is used as a working electrode, a standard electrode (or a reference electrode) is prepared, a voltage is applied between the working and standard electrodes, the change of an electric potential difference between the working and standard electrodes is measured by using the principle of electrolysis, and the corrosion resistance of the metal is relatively estimated.

The measurement of the change of the voltage difference is performed as follows. For example, as shown in FIG. 3(b), a salt bridge 46 made of a KCL solution packed into agar or the like is arranged at a central portion of a U-shaped tube 41. One side portion 41b of the U-shaped tube 41 is filled with a saturated KCL solution 48 functioning as an electrolyte solution, and the other side portion 41a of the U-shaped tube 41 is filled with a diluted KCL solution (0.01 N) 47 functioning as another electrolyte solution. The electrolyte solutions 47 and 48 are not mixed because of the salt bridge 46. Thereafter, a saturated calomel electrode (SCE) 43 processed by Pt is immersed in the saturated KCL solution 48 of the side portion 41b of the U-shaped tube 41 as the standard electrode, and a working electrode 42 made of an experimental sample is immersed in the diluted KCL solution 47 of the side portion 41a of the U-shaped tube 41. Thereafter, when a voltage of a battery 45 is applied between the working electrode 42 and the standard electrode 43, the diluted KCL solution 47 and the saturated KCL solution 48 are electrically connected through the salt bridge 46, and the current value and the voltage value are measured with a potentiostat 44. In this case, when an electric potential is swept in a plus direction, an anodic polarization occurs, and an anodic polarization curve expressed by a curve indicating the relationship between voltage and current is obtained.

Figure 3A:
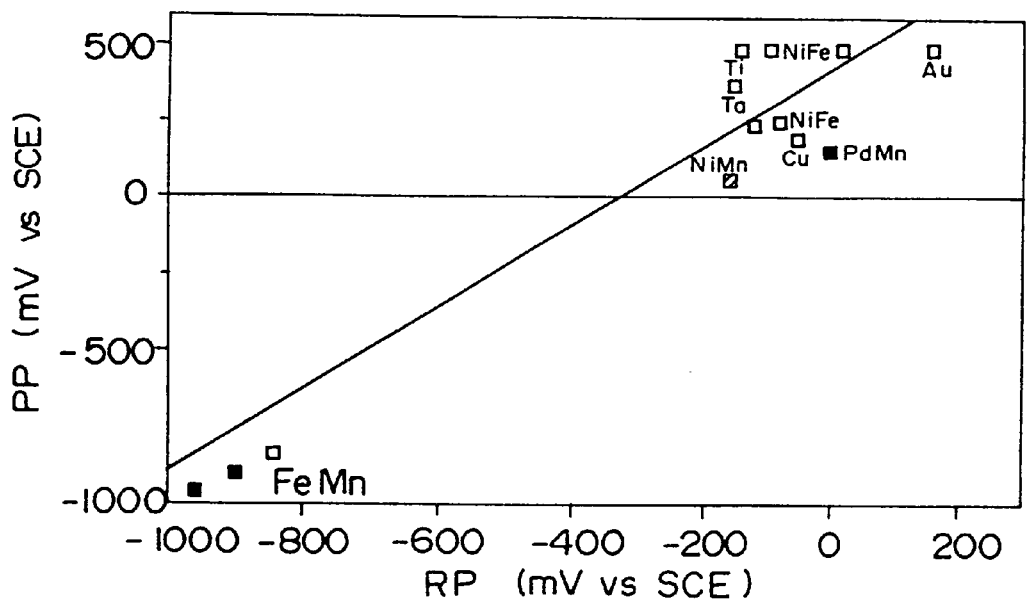
FIG. 3(a) is a characteristic view of an anodic polarization curve indicating an examined result of a corrosion resistance of a material of an antiferromagnetic layer according to a first embodiment of the present invention.
Figure 3B:
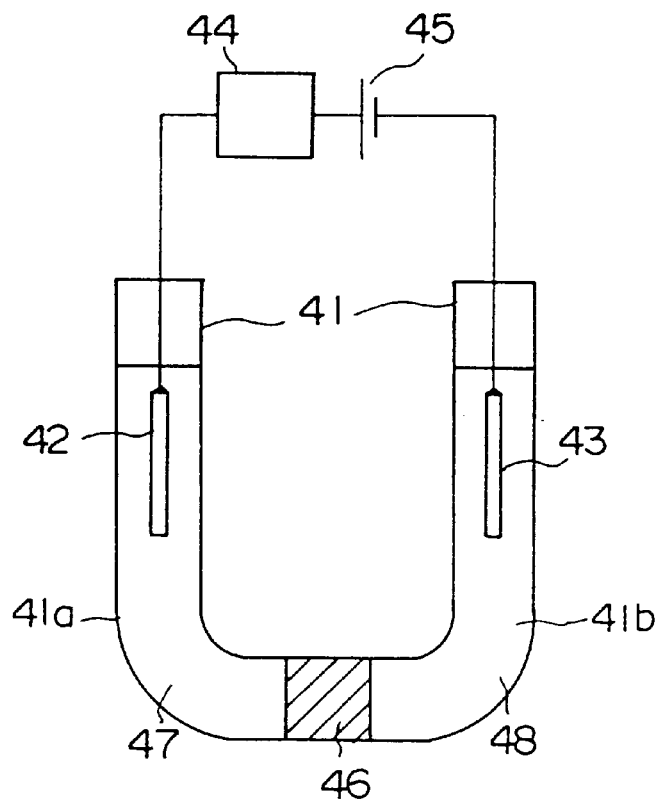
FIG. 3(b) is a constitutional view of an experimental apparatus used for the examination of the anodic polarization curve.

An anodic polarization curve indicating an examined result of the corrosion resistance of the experimental sample is shown in FIG. 3(a).

In FIG. 3(a), the X-axis indicates a natural potential RP (mV vs SCE) expressed by a linear scale, and the Y-axis indicates a pitting potential PP (mV vs SCE) expressed by a linear scale. A unit (mV vs SCE) indicates the potential difference of the working electrode 42 to the standard electrode 43 and "SCE" is an abbreviation of "Saturated Calomel Electrode".

The natural potential RP indicates the potential difference when the current measured by the potentiostat 44 is zero. The natural potential RP of the experimental sample corresponds to an ionization tendency of the experimental sample. That is, as the natural potential RP of the experimental sample becomes higher, the ionization tendency of the experimental sample becomes lower, and the reactivity of the experimental sample becomes lower, that is, it becomes more resistive to corrosion.

The pitting potential PP indicates the potential difference at the time when a surface of the sample starts corroding, and as the pitting potential PP becomes higher, the corrosion resistance property becomes higher.

As shown in FIG. 3(a), the corrosion resistance of the PdMn alloy is much higher than that of the FeMn alloy and is almost the same as that of the NiMn alloy. Also, the corrosion resistance of the PdPtMn alloy is much higher than that of the PdMn alloy and is almost the same as that of the NiFe alloy.

(b) A heating process experiment for giving an antiferromagnetic property to a material (i) PdMn film An experimental sample used for a heating process experiment comprises a silicon substrate, a ground layer which is made of Ta having a film thickness of 30 nm and is arranged on the silicon substrate, a soft magnetic layer made of an NiFe alloy having a film thickness of 20 nm, an antiferromagnetic layer made of a PdMn alloy having a film thickness of 25 nm, and a protective layer made of Ta having a film thickness of 10 nm which are arranged in a layered configuration in that order. In this experiment, the composition of the PdMn film is variously changed, and a plurality of experimental samples are prepared.

Figure 4:
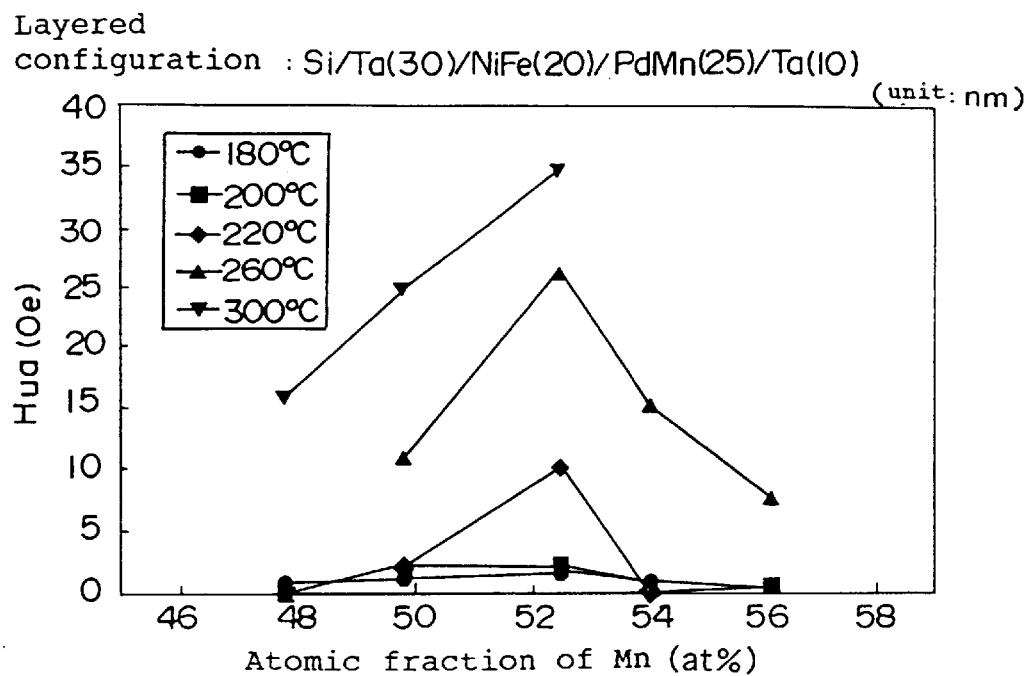
FIG. 4 is a characteristic view showing the results of an experiment for giving a bias magnetic field Hua to a PdMn film in a heating process according to the first embodiment of the present invention and showing a correlation between a bias magnetic field (Hua) and an Mn atomic fraction by using the heating process temperature as a parameter.

FIG. 4 is a characteristic view showing the experimental results, and an intensity of a bias magnetic field Hua to an Mn atomic fraction is indicated by using the heating process temperature (180 to 30° C.) as a parameter. The X-axis indicates an Mn atomic fraction (at %) in the PdMn antiferromagnetic layer expressed by a linear scale, and the Y-axis indicates a bias magnetic field Hua (oersteds: Oe) expressed by a linear scale.

As shown in FIG. 4, the bias magnetic field Hua greatly depends on the Mn atomic fraction (that is, a Pd atomic fraction). The bias magnetic field occurs at a comparatively low temperature of 220° C. for the heating process or at a higher temperature at an Mn atomic fraction ranging from 50 to 54 at %, and the intensity of the bias magnetic field is maximized at an Mn atomic fraction of almost 53 at %. Therefore, even though the heating process is performed at a temperature of 220° C., the bias magnetic field Hua having a sufficient intensity can be obtained by adjusting the film thickness of the soft magnetic layer. In this experiment, the intensity of the bias magnetic field Hua is not important, but the occurrence of the bias magnetic field Hua is important. That is, because the film thickness of the NiFe film used in the experiment is considerably thick, the intensity of the bias magnetic field Hua is lowered. In other words, the intensity of the bias magnetic field Hua can be heightened by thinning the film thickness of the NiFe film.

Figure 7:
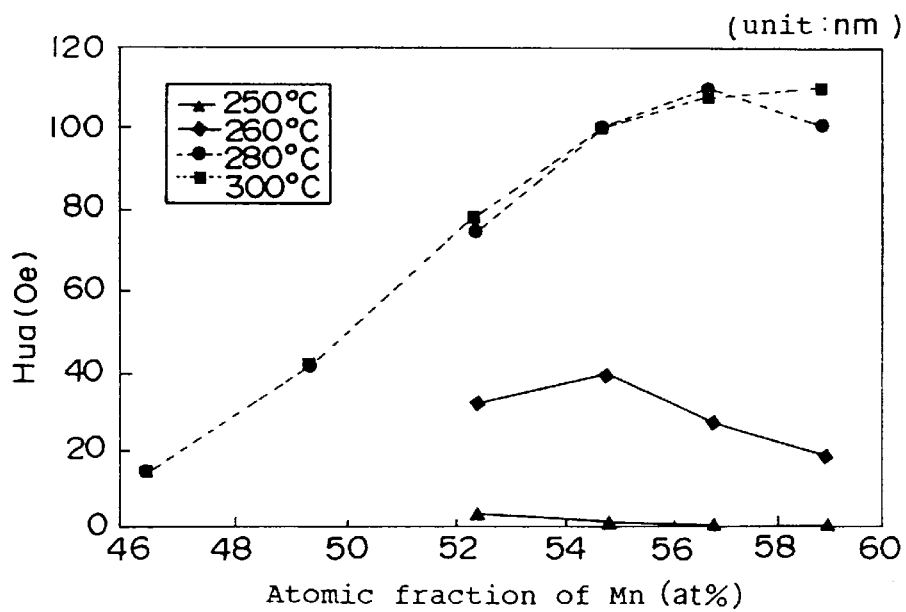
FIG. 7 is a characteristic view showing the correlation between the bias magnetic field (Hua) and the Mn atomic fraction in an NiMn film according to a compared example of the first embodiment of the present invention.

For the purpose of the comparison with the antiferromagnetic layer made of the PdMn alloy, an example in which an NiMn film having a film thickness of 25 nm is used as an antiferromagnetic layer is shown in FIG. 7. As shown in FIG. 7, no bias magnetic field Hua occurs at a heating process temperature of 250° C., and a bias magnetic field Hua occurs at a heating process temperature of 260° C. Therefore, the heating process temperature in the antiferromagnetic layer made of the NiMn film is considerably high as compared with that in the antiferromagnetic layer made of the PdMn alloy.

Figure 5:
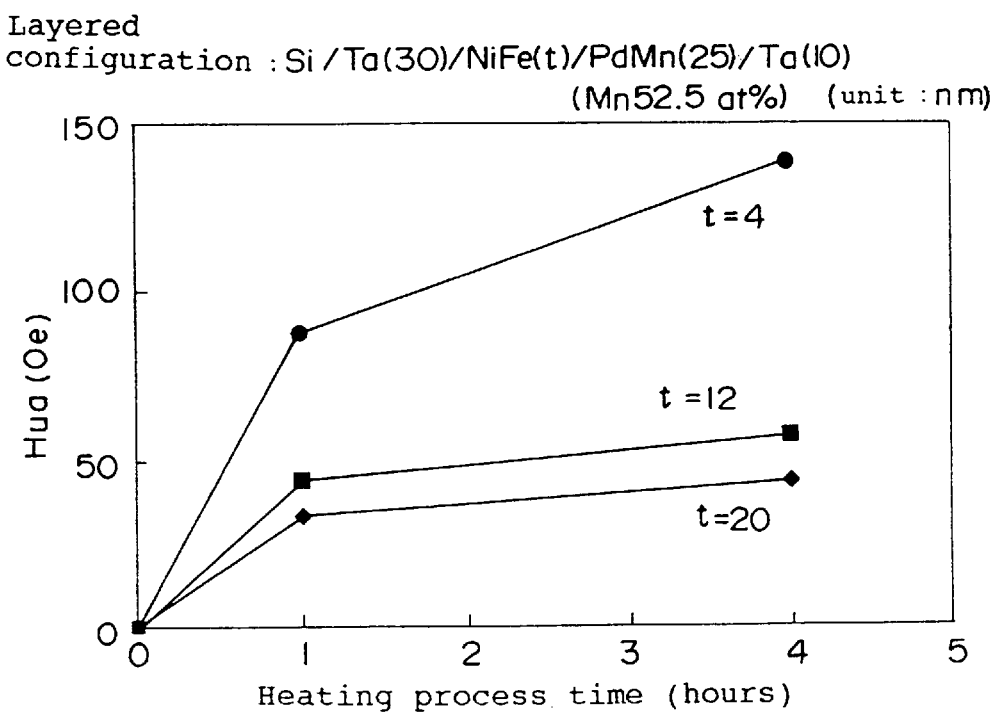
FIG. 5 is a characteristic view showing the results of an experiment for giving a bias magnetic field Hua to a PdMn film in a heating process according to the first embodiment of the present invention and showing a correlation between a bias magnetic field (Hua) and the heating process time by using the film thickness t of an NiFe contacting with a PdMn film as a parameter.

FIG. 5 shows the change of the bias magnetic field Hua with respect to the heating process time for the above experimental sample by using the film thickness (t) of the NiFe film as a parameter. The X-axis indicates the heating process time (H) expressed by a linear scale, and the Y-axis indicates a bias magnetic field Hua (Oe) expressed by a linear scale.

As shown in FIG. 5, in cases where the heating process time is lengthened or the film thickness (t) of the NiFe film is thinned, a bias magnetic field Hua having a higher intensity can be obtained.

Figure 6:
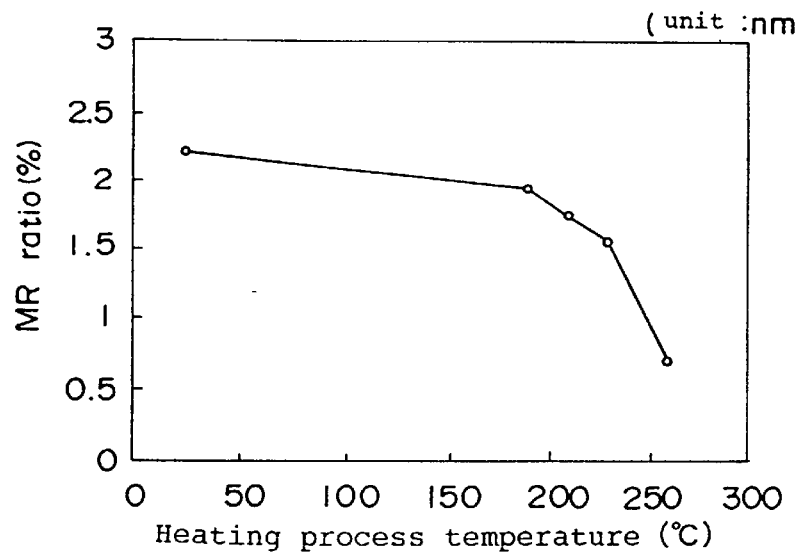
FIG. 6 is a characteristic view showing that the magnetic resistance (MR) ratio of a magnetoresistive head comprising a nonmagnetic metal layer made of Cu and an FeNi film making contact with the nonmagnetic metal layer changes with the heating process temperature.

Also, FIG. 6 is a characteristic view showing the magnetoresistive property changing with the heating process temperature. The X-axis indicates the heating process temperature (° C.) expressed by a linear scale, and the Y axis indicates a magnetic resistance (MR) ratio (%) expressed by a linear scale. The MR ratio denotes $\Delta \rho/\rho$. An experimental sample comprises a silicon substrate, a ground layer which is made of a Ta film having a film thickness of 5 nm and is formed on the silicon substrate, a soft magnetic layer made of an NiFe alloy having a film thickness of 9 nm, a nonmagnetic metal layer made of a Cu film having a film thickness of 4 nm, a soft magnetic layer made of an NiFe film having a film thickness of 4 nm, an antiferromagnetic layer made of a FeMn alloy having a film thickness of 19 nm, and a protective layer made of a Ta film having a film thickness of 10 nm which are arranged in a layered configuration in that order.

As shown in FIG. 6, a sudden decrease of the MR ratio starts from a heat is temperature of almost 200° C. Accordingly, it is preferred that the heating process be performed at a temperature lower than the heating process temperature of 200° C.

In the experimental example, because an antiferromagnetic property can be given to the PdMn film at a low heating process temperature of 220° C., the deterioration of the magnetoresistive characteristic can be considerably suppressed.

(ii) PdPtMn film

An experimental sample comprises a silicon substrate, a Ta ground layer having a film thickness of 10 nm which is formed on the silicon substrate, an NiFe soft magnetic layer having a film thickness of 20 nm, a PdPtMn antiferromagnetic layer having a film thickness of 25 nm, and a Ta protective layer having a film thickness of 10 nm, which are arranged in a layered configuration in that order. In this experiment, the composition of the PdPtMn film is variously changed, and a plurality of experimental samples are prepared.

Figure 8:
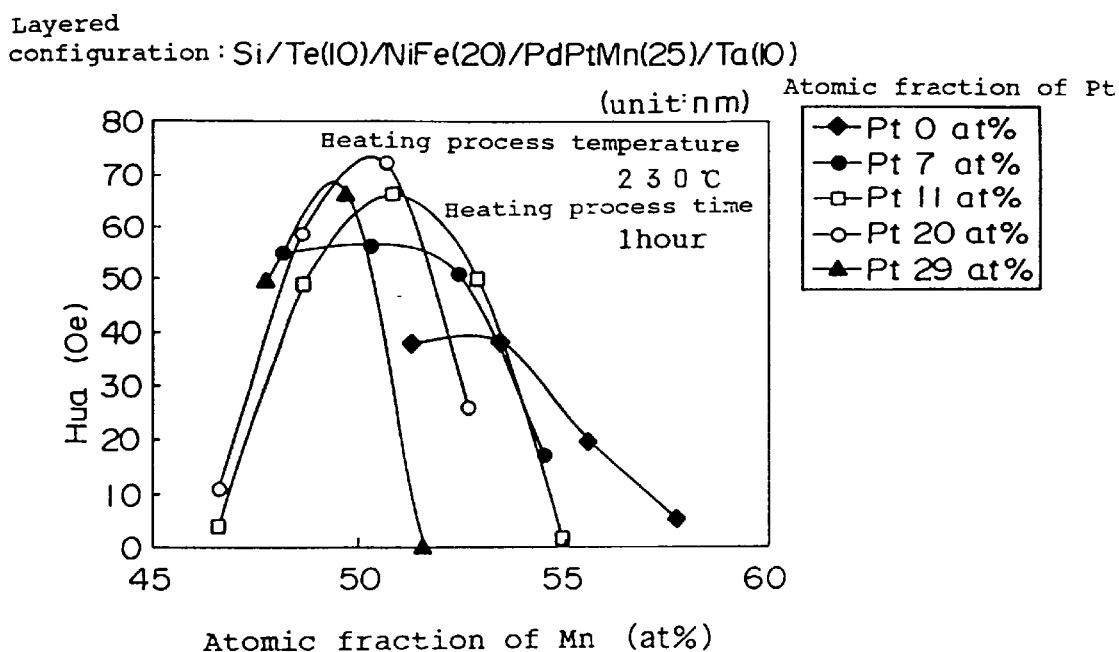
FIG. 8 is a characteristic view showing the results of an experiment for giving a bias magnetic field Hua to a PdPtMn film in a heating process according to the first embodiment of the present invention and showing the correlation between a bias magnetic field (Hua) and an Mn atomic fraction by using a Pt atomic fraction as a parameter.

FIG. 8 is a characteristic view showing the experimental results, and the intensity of the bias magnetic field Hua with respect to an Mn atomic fraction is indicated by using a Pt atomic fraction as a parameter. The heating process temperature is fixed to 230° C., and the heating process time is fixed to one hour. The X-axis indicates an Mn atomic fraction (at %) expressed by the linear scale, and the Y-axis indicates a bias magnetic field Hua (Oe) expressed by a linear scale. The Pt atomic fraction in the PdPtMn film is expressed by using a black diamond sign for 0 at % (corresponding to PdMn), a black circle sign for 7 at %, a white square sign for 11 at %, a white circle sign for 20 at % and a black triangle sign for 29 at %.

As shown in FIG. 8, the bias magnetic field Hua greatly depends on the Mn atomic fraction and the Pt atomic fraction, the Mn atomic fraction is maximized at almost 51%, and the Pt atomic fraction is maximized at almost 20%. Also, the bias magnetic field Hua having a maximum intensity of 73 OE occurs at a relatively low heating process temperature of almost 230° C. Besides, the bias magnetic field Hua having a maximum intensity of 40 Oe occurs in case of the Pt atomic fraction 0% which corresponds to the PdMn film, whereas the intensity of the bias magnetic field Hua in the PdPtMn film is almost twice as high as that in the PdMn film.

Figure 9:
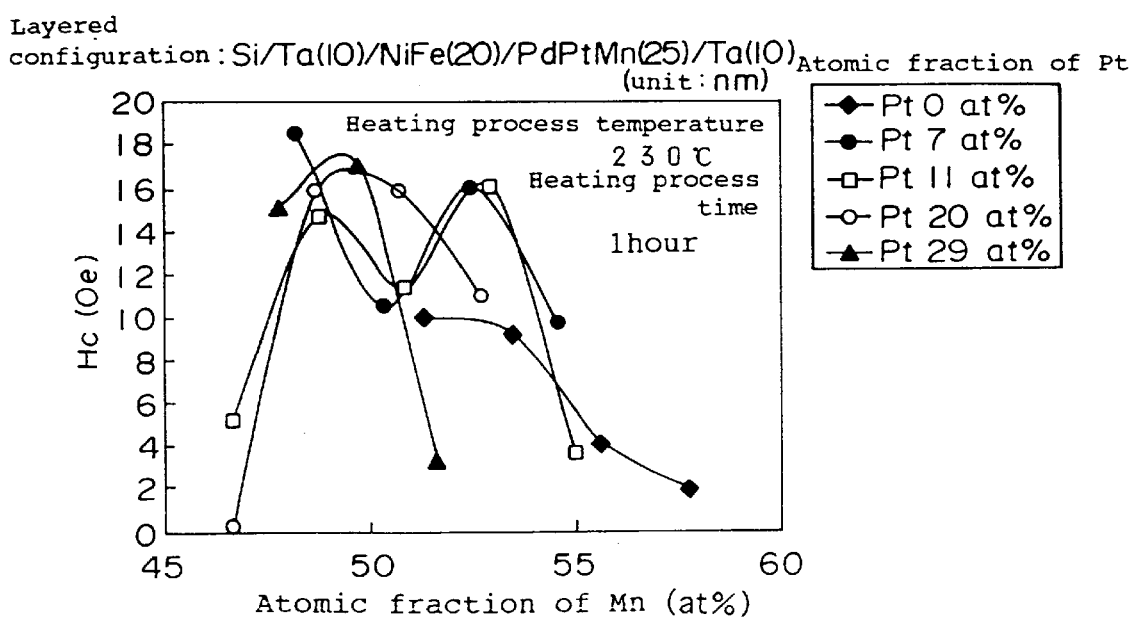
FIG. 9 is a characteristic view showing the results of an experiment for generating a coercive force Hc in a heating process according to the first embodiment of the present invention and showing the correlation between a coercive force Hc and an Mn atomic fraction by using a Pt atomic fraction as a parameter.

FIG. 9 shows a result obtained by measuring the coercive force Hc of the same experimental sample as that in the FIG. 8 when the experimental conditions are the same as those in FIG. 8. The intensity of a coercive force Hc to an Mn atomic fraction is indicated by using a Pt atomic fraction as a parameter. The X-axis indicates an Mn atomic fraction (at %) expressed by a linear scale, and the Y-axis indicates the coercive force Hc (Oe) expressed by a linear scale.

As shown in FIG. 9, the intensity of the coercive force Hc is equal to or lower than 20 Oe for any of the experimental samples, and the intensity of the coercive force Hc is lower than the intensity of the bias magnetic field Hua. Therefore, no problem exists in the coercive force Hc in practice.

Figure 12:
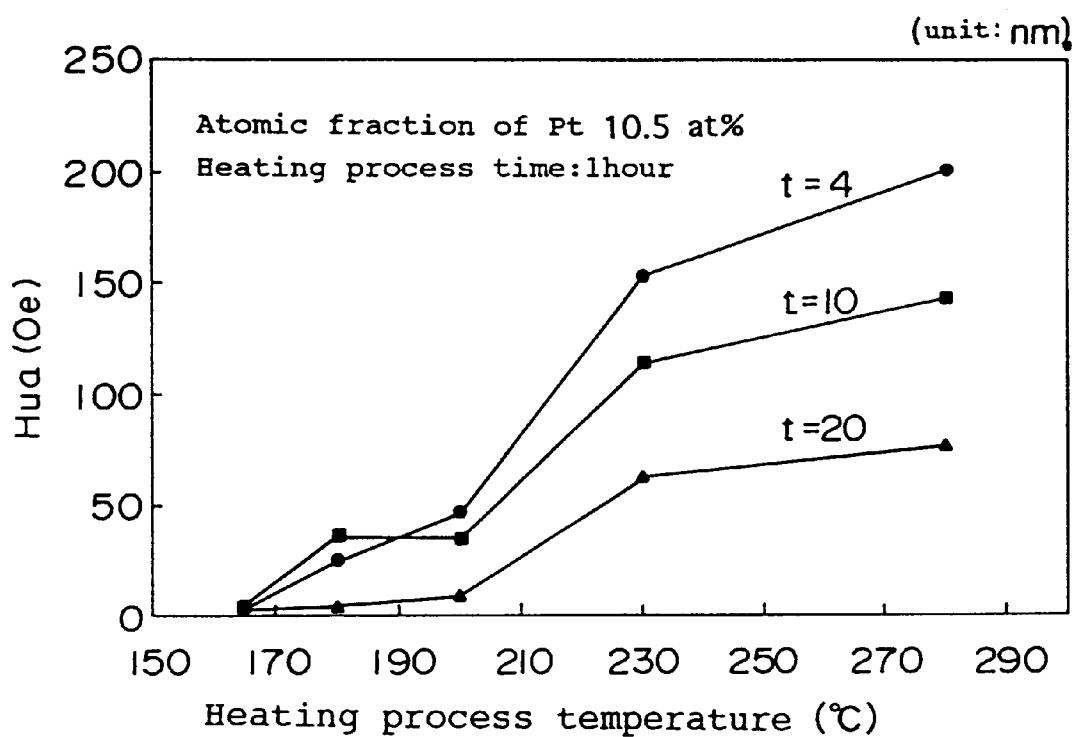
FIG. 12 is a characteristic view showing the results of an experiment for giving a bias magnetic field Hua to a PdPtMn film in a heating process according to the first embodiment of the present invention and showing the correlation between the bias magnetic field Hua and a heating process temperature by using a film thickness of an NiFe film as a parameter.

FIG. 12 is a characteristic view showing the bias magnetic field Hua changing with the heating process temperature while using a film thickness of the NiFe film as a parameter. The three NiFe films having respective film thicknesses of 4 nm, 10 nm and 20 nm are prepared. A Pt atomic fraction of the PdPtMn film is fixed to 10.5 at %. The X-axis indicates the heating process temperature expressed by a linear scale, and the Y-axis indicates the bias magnetic field Hua (Oe) expressed by a linear scale.

As shown in FIG. 12, when the film thickness of the NiFe film is thinned to a value equal to or lower than 10 nm, the bias magnetic field Hua having a high intensity occurs at a lower heating process temperature equal to or higher than almost 170° C.

Figure 10:
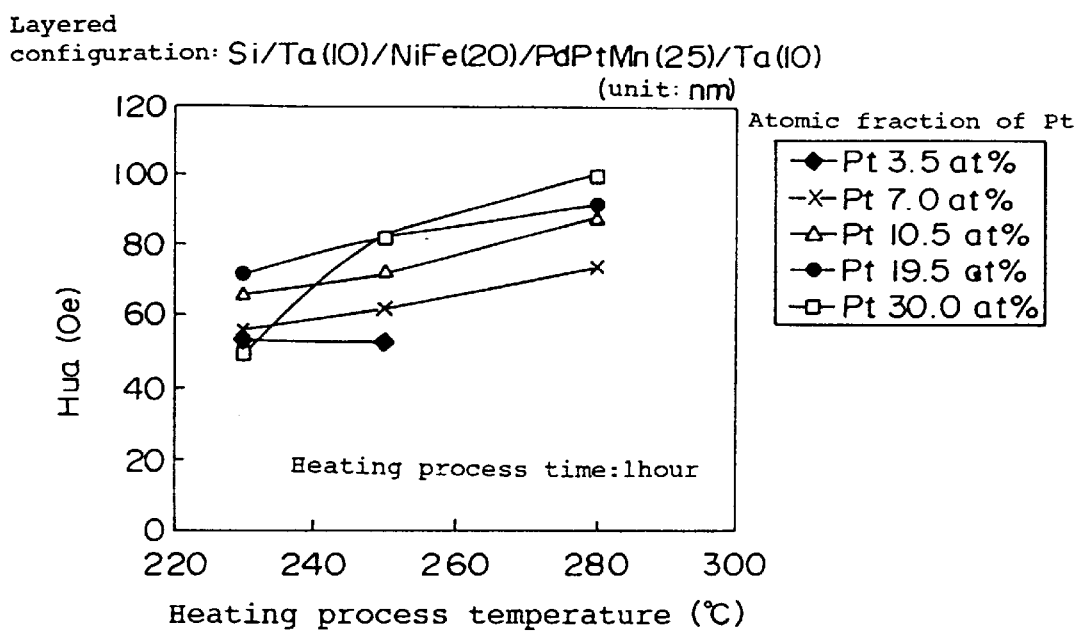
FIG. 10 is a characteristic view showing the results of an experiment for giving a bias magnetic field Hua to a PdPtMn film in a heating process according to the first embodiment of the present invention and showing the correlation between the bias magnetic field Hua and a heating process temperature by using a Pt atomic fraction as a parameter.

FIG. 10 is a characteristic view showing the bias magnetic field Hua changing with the heating process temperature while using a Pt atomic ratio as a parameter for the above experimental samples. The heating process time is fixed to one hour. The X-axis indicates a heating process temperature (° C.) expressed by a linear scale, and the Y-axis indicates the bias magnetic field Hua (Oe) expressed by a linear scale. The Pt atomic fraction in the PdPtMn film is expressed by using a black diamond sign for 3.5 at %, a cross sign for 7.0 at %, a white triangle sign for 10.5 at %, a black circle sign for 19.5 at % and a white square sign for 30.0 at %.

Figure 11:
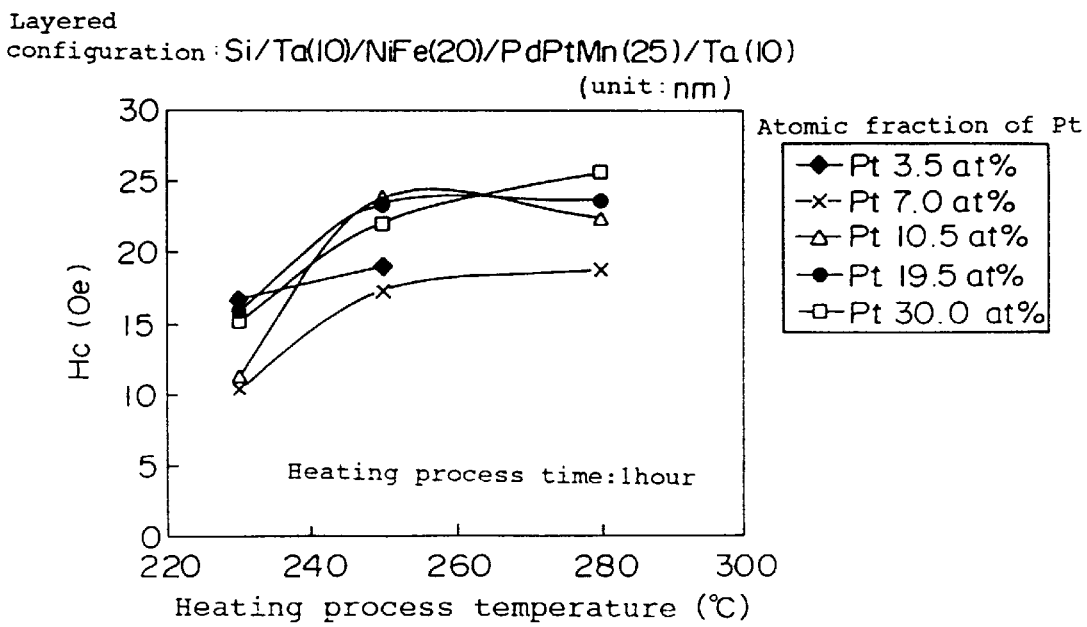
FIG. 11 is a characteristic view showing the results of an experiment for generating a coercive force Hc in a heating process according to the first embodiment of the present invention and showing the correlation between a coercive force Hc and a heating process temperature by using a Pt atomic fraction as a parameter.

FIG. 11 is a characteristic view showing the coercive force Hc changing with the heating process temperature while using a Pt atomic ratio as a parameter for the above experimental samples. The other conditions are the same as those in FIG. 10. The X-axis indicates the heating process temperature (° C.) expressed by a linear scale, and the Y-axis indicates the coercive force Hc (Oe) expressed by a linear scale.

As shown in FIGS. 10 and 11, as the heating process temperature becomes higher, the intensity of the bias magnetic field Hua becomes higher, and the bias magnetic field Hua reaches a maximum intensity of almost 100 Oe at a heating process temperature of 280° C. In contrast, the coercive force Hc reaches a maximum intensity of almost 25 Oe. Therefore, the intensity of the coercive force Hc is considerably lower than that of the bias magnetic field Hua.

Accordingly, the bias magnetic field Hua can be obtained in the PdPtMn film at the low heating processing temperature, and the PdPtMn film can be used in a laminated type giant magnetoresistive head including the NiFe film and the Cu film without degrading the characteristics of the magnetoresistive head. Also, because the corrosion resistance of the PdPtMn alloy is superior to that of the FeMn alloy, when the PdPtMn alloy is used as an antiferromagnetic layer, the reliability of the magnetoresistive head can be improved.

(2) A second embodiment

Figure 13:
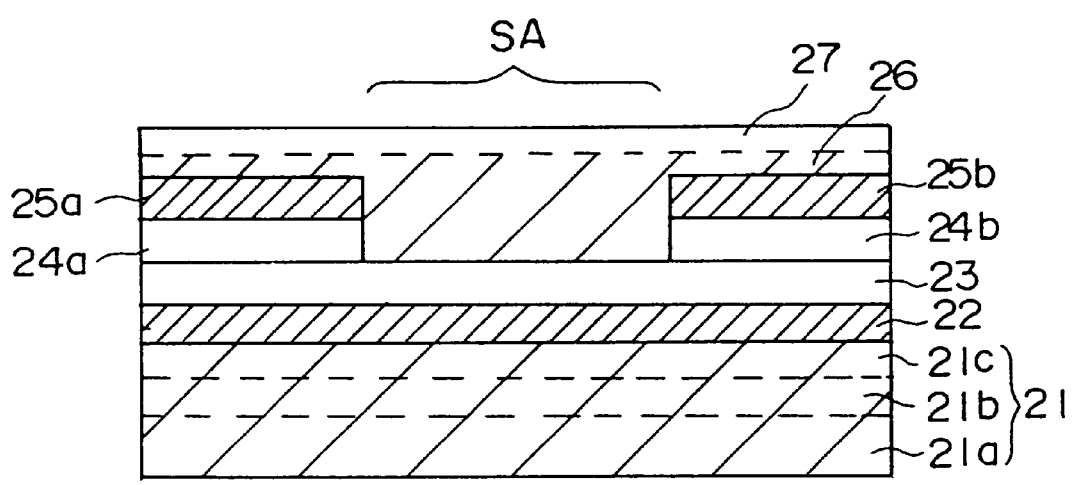
FIG. 13 is a cross-sectional view (No. 1) of a magnetoresistive head using an anisotropic magnetoresistive effect according to a second embodiment of the present invention.

A magnetoresistive head (MR head) according to the second embodiment of the present invention is described with reference to FIG. 13. FIG. 13 is a cross-sectional view of a magnetoresistive head (MR head) according to the second embodiment of the present invention. An example of an anisotropic magnetoresistive film (AMR film) is described.

As shown in FIG. 13, a TiC base 21a of which a surface is coated with an alumina film, a lower portion magnetic shielding layer 21b made of an FeN film or an FeAlSi film having a film thickness of 1.5 µm and a gap layer 21c made of an alumina film having a film thickness of 120 nm are arranged in a layered configuration in that order to produce a substrate 21.

Thereafter, a Ti film 22 having a film thickness of 10 nm is formed on the substrate 21 as a ground layer, and an anisotropic magnetoresistive film 23 made of an NiFe film having a film thickness of 20 nm is formed on the Ti film 22. Thereafter, a layered body of the TiC substrate 21a, the Ti film 22 and the anisotropic magnetoresistive film 23 is patterned to a rectangular shape having a lateral length of 50 µm and a longitudinal length of 2 µm.

Thereafter, a pair of PdMn films (or a pair of antiferromagnetic layers) 24a and 24b having a film thickness of 25 nm are formed on both ends of a surface of the anisotropic magnetoresistive film 23 to control a plurality of magnetic domains of the an isotropic magnetoresistive film 23, and a pair of electrodes 25a and 25b made of a gold (Au) film having a film thickness of 200 nm are formed on the PdMn films 24a and 24b. In this case, the anisotropic magnetoresistive film 23, the PdMn films 24a and 24b and the electrodes 25a and 25b are respectively formed according to a sputtering method while applying a magnetic field of 30 Oe. In particular, a PdMn alloy having a desired atomic fraction is hit with Ar ions in the sputtering formation of the PdMn films. Thereafter, a gap layer 26 made of an a lumina film is formed on the anisotropic magnetoresistive film 23 and the electrodes 25a and 25b, and an upper magnetic shielding layer 27 made of an NiFe film is formed on the gap layer 26.

After all of the processes for forming the films and electrodes are finished, a heating process for the PdMn films 24a and 24b is performed in a vacuum furnace at a temperature of 220° C. for one hour, and an antiferromagnetic property is given to the PdMn films 24a and 24b. Therefore, a bias magnetic field Hua is generated in the PdMn films 24a and 24b.

Accordingly, because the PdMn film is used in place of the FeMn film which is conventionally used to control a plurality of magnetic domains, the anti-ferromagnetic layers 24a and 24b having superior corrosion resistance can be formed without degrading the magnetoresistive characteristics of the anisotropic magnetoresistive film 23.

Figure 14:
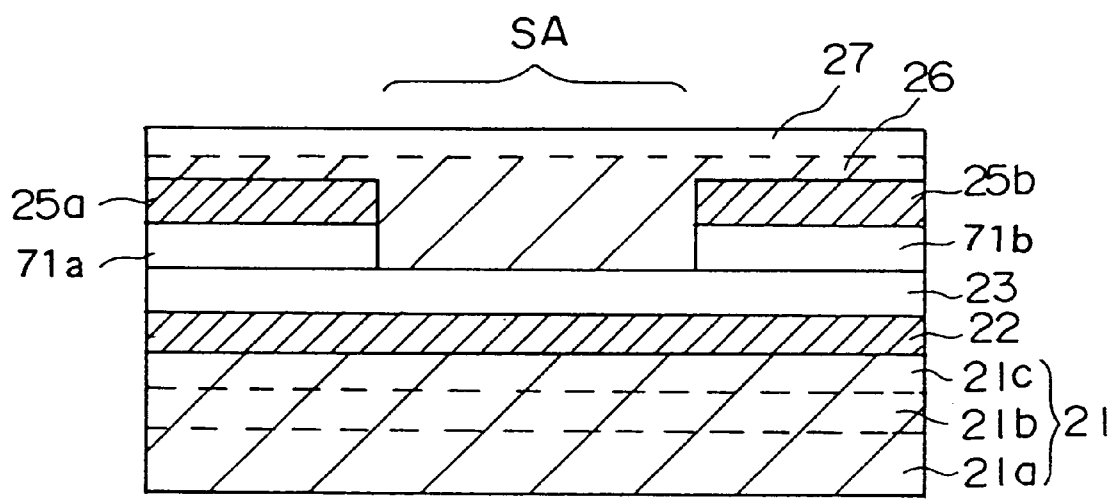
FIG. 14 is a cross-sectional view (No. 2) of a magnetoresistive head using an anisotropic magnetoresistive effect according to the second embodiment of the present invention.

As shown in FIG. 14, it is applicable that a pair of PdPtMn films 71a and 71b be arranged in place of the PdMn films 24a and 24b. Constitutional elements in FIG. 14 which are the same as those in FIG. 13 are designated by the same reference numerals as those in FIG. 13. In this case, the Pt atomic fraction and the Mn atomic fraction can be properly adjusted. The adjustment of the atomic fraction can be performed, for example, by adjusting the exposed area of an element corresponding to each film component at a target surface for the sputtering operation. Also, the heating process condition can be properly selected to give the antiferromagnetic property. As a preferred example, a heating process temperature of 230° C. and a heating process time of five hours can be used. Because the heating process temperature for giving the antiferromagnetic property is low, an antiferromagnetic layer with superior corrosion resistance can be formed without degrading the magnetoresistive characteristics of the anisotropic magnetoresistive film.

(3) A third embodiment

Figure 15A:
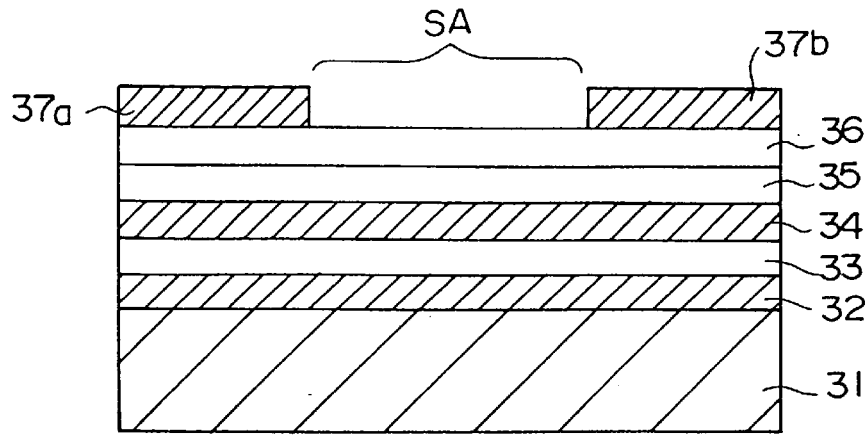
FIGS. 15(a) to 15(c) are cross-sectional views (No. 1) showing a magnetoresistive head using a spin valve magnetoresistive effect according to a third embodiment of the present invention.

A magnetoresistive head (MR head) according to the third embodiment of the present invention is described with reference to FIG. 15(a). FIG. 15(a) is a cross-sectional view showing a configuration of a magnetoresistive head (MR head) according to the third embodiment of the present invention. The difference of the MR head shown in FIG. 15(a) from that shown in FIG. 13 is that a spin valve magnetoresistive film is used in place of the anisotropic magnetoresistive film.

As shown in FIG. 15(a), a ground layer 32 made of a Ta film having a film thickness of 10 nm, a soft magnetic layer (or a second soft magnetic layer) 33 made of an NiFe film having a film thickness of 9 nm, a nonmagnetic metal layer 34 made of a Cu film having a film thickness of 2 nm, a soft magnetic layer (or a first soft magnetic layer) 35 made of an NiFe film having a film thickness of 4 nm and an antiferromagnetic layer 36 made of a PdMn film having a film thickness of 25 nm are formed one after another on an Si substrate 31 having a (100) plane in that order according to a sputtering method while applying a magnetic field of 30 Oe intensity. The soft magnetic layer 33 functions as a spin valve magnetoresistive film.

Thereafter, the heating process for the PdMn film 36 is performed in a vacuum furnace at a temperature of 230° C. for four hours while applying a magnetic field of about 2000 Oe intensity to the PdMn film 36, and an antiferromagnetic property is given to the PdMn film 36. With this, a bias magnetic field Hua is generated in the PdMn film 36.

Thereafter, a pair of electrodes 37a and 37b are formed on both ends of a surface of the antiferromagnetic layer 36. Therefore, a sense current is in from one of the electrodes 37a and 37b, passes by way of the antiferromagnetic layer 36, and is out from another electrode.

In the third embodiment, because the PdMn film 36 is heated at the low temperature of 230° C., the magnetoresistive characteristics of the spin valve magnetoresistive film 33 are not degraded, and a antiferromagnetic layer 36 with superior corrosion resistance can be formed.

Figure 15B:
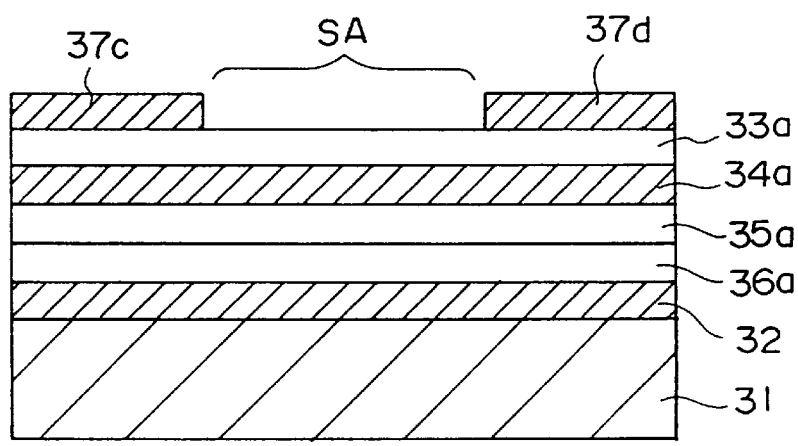

It is applicable that a layered structure composed of the layers 33 to 36 can be inversely arranged. That is, as shown in FIG. 15(b), it is applicable that the ground layer 32 made of Ta, an antiferromagnetic layer 36a made of PdMn, a soft magnetic layer 35a made of NiFe, Co NiFe or the like, a nonmagnetic metal layer 34a made of Cu and a soft magnetic layer 33a made of NiFe or the like are formed one after another on the silicon substrate 31 in that order. A pair of electrodes 37c and 37d are formed on both ends of a surface of the soft magnetic layer 33a. Also, in place of the soft magnetic layer 35a made of NiFe, it is applicable that a magnetic layer made of Co may be formed on the antiferromagnetic layer 36a made of PdMn. In this case, the MR ratio is improved as compared with that of the MR head in which the soft magnetic layer 35a made of NiFe is used.

Figure 15C:
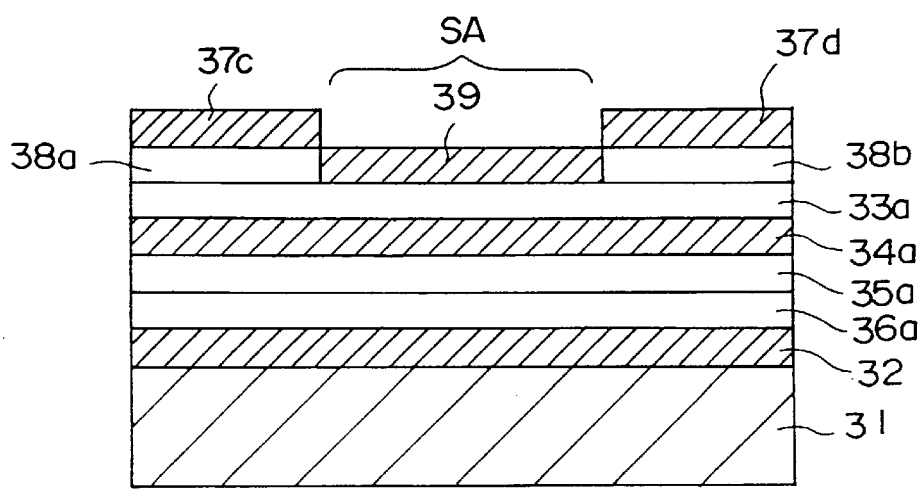

As shown in FIG. 15(c), it is applicable that a pair of antiferromagnetic layers 38a and 38b made of a PdMn alloy may be formed on both ends of the free soft magnetic layer 33a and the electrodes 37c and 37d and an insulating protective layer 39 may be formed on the soft magnetic layer 33a to protect a sense region. In this case, a magnetizing direction of the soft magnetic layer 33a which is placed at the uppermost position among the layers 31 to 33a changes with a signal magnetic field by the function of the antiferromagnetic layers 38a and 38b. Therefore, when the intensity of the signal magnetic field is set to zero, the magnetizing direction of the soft magnetic layer 33a is aligned, and a magnetoresistive characteristic having superior linearity can be obtained in the MR head.

Figure 16A:
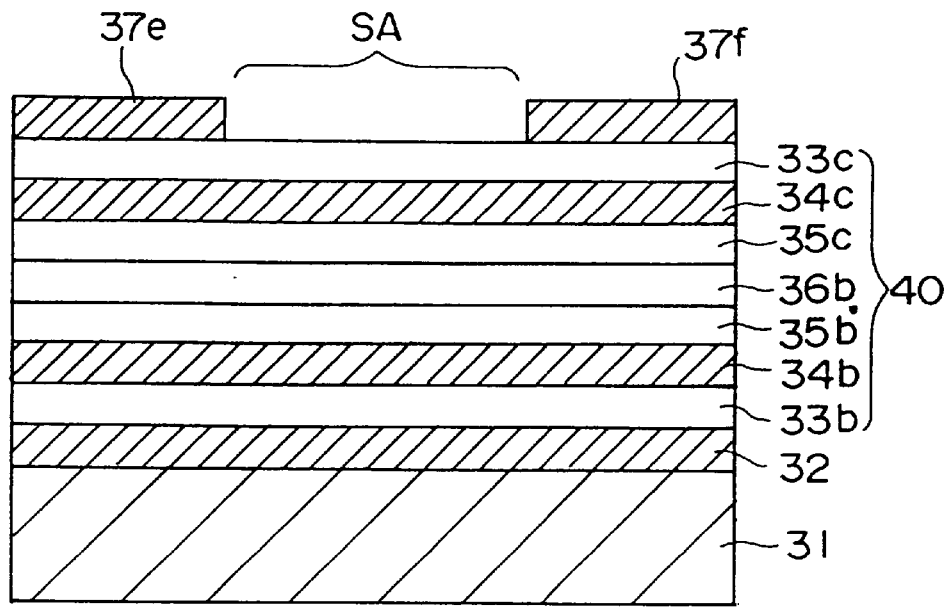
FIGS. 16(a) and 16(b) are cross-sectional views (No. 2) showing a magnetoresistive head using a spin valve magnetoresistive effect according to the third embodiment of the present invention.

Further, as shown in FIG. 16(a), it is applicable that the ground layer 32, a free magnetic layer (or a second soft magnetic layer) 33b, a nonmagnetic metal layer 34b, a pinned magnetic layer (or a first soft magnetic layer) 35b, an antiferromagnetic layer 36b, a pinned magnetic layer (or a first soft magnetic layer) 35c, a nonmagnetic metal layer 34c and a free magnetic layer (or a second soft magnetic layer) 33c may be formed one after another on the silicon substrate 31 in that order. A pair of electrodes 37e and 37f are additionally arranged on both ends of a surface of the free magnetic layer 33c to lead a sense current to the free magnetic layer 33c. That is, a first group of a second magnetic layer, a nonmagnetic metal layer and a first magnetic layer corresponding to the layers 33 to 35 shown in FIG. 15(a) and a second group of a second magnetic layer, a nonmagnetic metal layer and a first magnetic layer corresponding to the layers 33a to 35a shown in FIG. 15(b) are symmetrically arranged each other with respect to the antiferromagnetic layer 36b to form a layered structure 40. Therefore, sensitivity of the MR head can be improved.

Figure 16B:
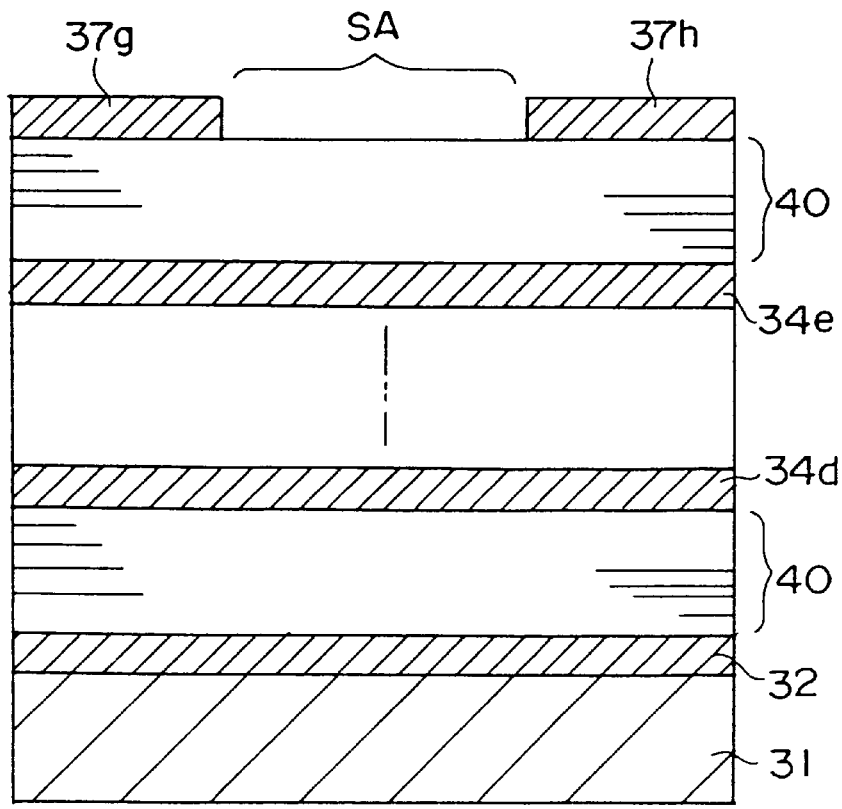

Also, as shown in FIG. 16(b), it is applicable that a plurality of layered structures 40 can be arranged in series on the ground layer 32 while arranging a nonmagnetic metal layer 34d or 34e made of Cu or the like between each pair of layered structures 40. A pair of electrodes 37g and 37h are additionally arranged on both ends of a surface of the free magnetic layer 33c of the uppermost layered structure 40 to lead a sense current to the free magnetic layer 33c. Therefore, sensitivity of the MR head can be moreover improved.

Figure 17A:
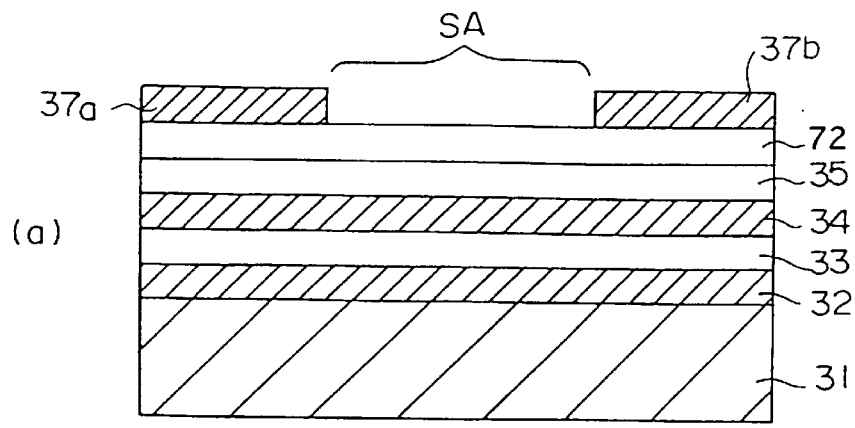
FIGS. 17(a) to 17(c) are cross-sectional views (No. 3) showing a magnetoresistive head using a spin valve magnetoresistive effect according to the third embodiment of the present invention.
Figure 17B:
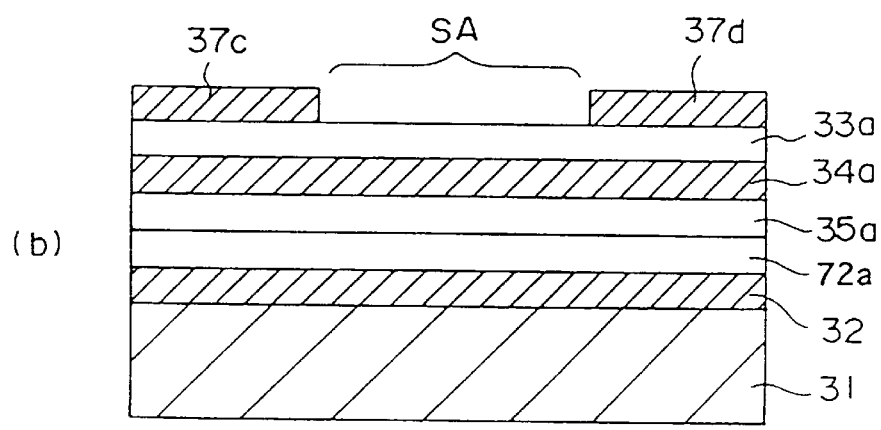
Figure 17C:
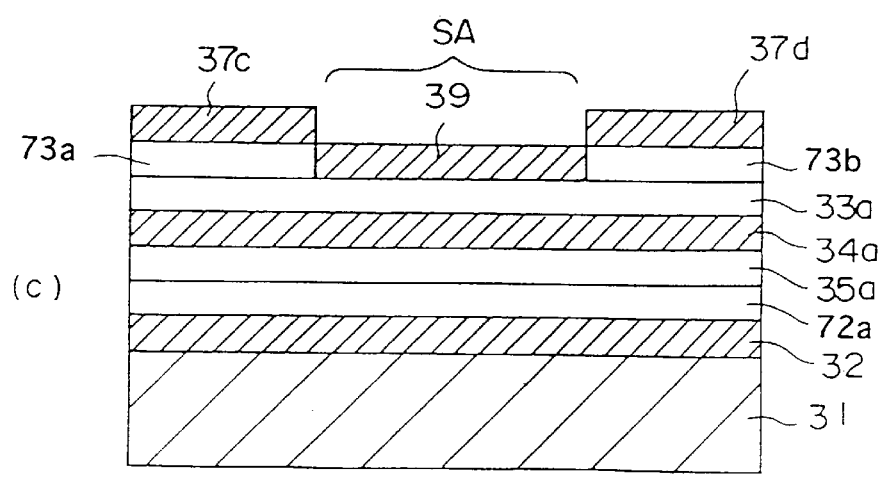
Figure 18A:
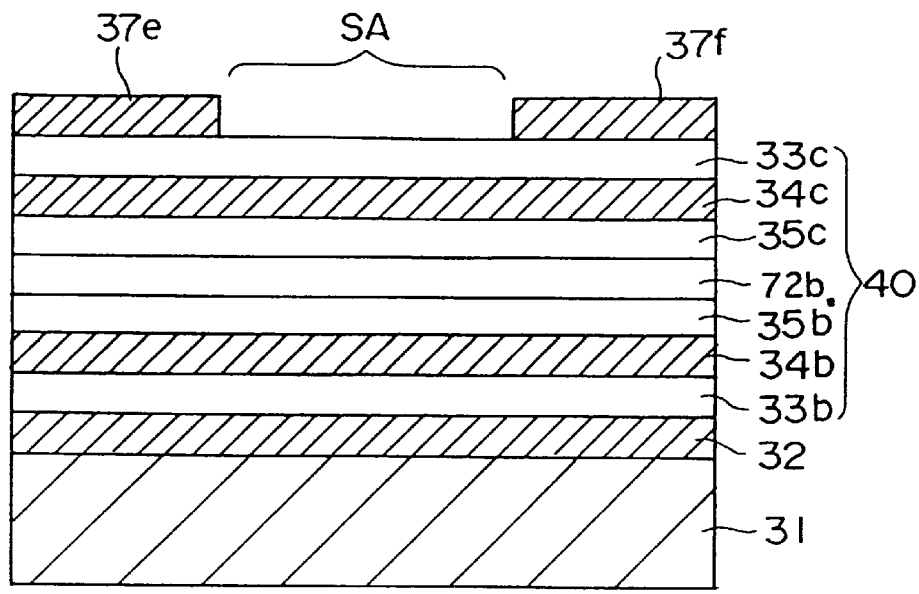
FIGS. 18(a) and 18(b) are cross-sectional views (No. 4) showing a magnetoresistive head using a spin valve magnetoresistive effect according to the third embodiment of the present invention.
Figure 18B:
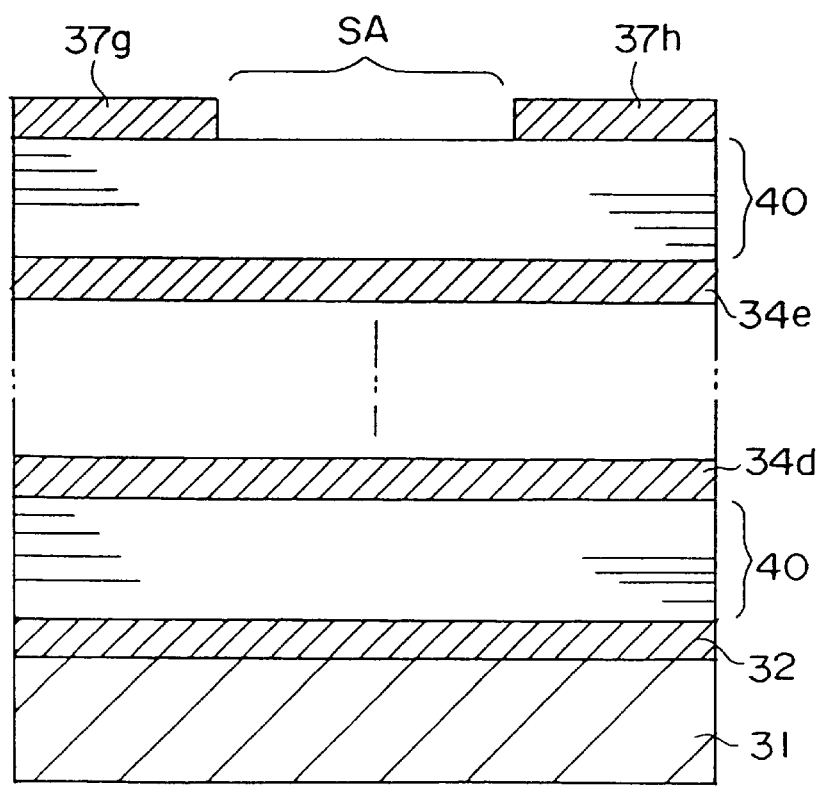

In addition, as shown-in FIG. 17(a), it is applicable that an antiferromagnetic layer 72 made of a PdPtMn film may be used in place of the antiferromagnetic layer 36 shown in FIG. 15(a). Also, as shown in FIGS. 17(b) and 17(c), it is applicable that an antiferromagnetic layer 72a, 73a and 73b made of a PdPtMn film may be used in place of the antiferromagnetic layer 36a, 38a and 38b shown in FIGS. 15(b) and 15(c). Also, as shown in FIGS. 18(a) and 18(b), it is applicable that an antiferromagnetic layer 72b made of a PdPtMn film may be used in place of the antiferromagnetic layer 36b shown in FIGS. 16(a) and 16(b). In this case, constitutional elements in FIGS. 17(a) to 18(b) which are the same as those in FIGS. 15(a) to 16(b) are designated by the same reference numerals as those in FIGS. 15(a) to 16(b). In this case, the Pt atomic fraction and the Mn atomic fraction can be properly adjusted. Also, the heating process condition can be properly selected to give the antiferromagnetic property. As a preferred example, a heating process temperature of 250° C. and a heating process time of five hours can be used. Because the heating process temperature for giving the antiferromagnetic property is low, the antiferromagnetic layer having superior corrosion resistance can be formed without degrading the magnetoresistive characteristics of the spin valve magnetoresistive film.

(4) A fourth embodiment

Figure 19A:
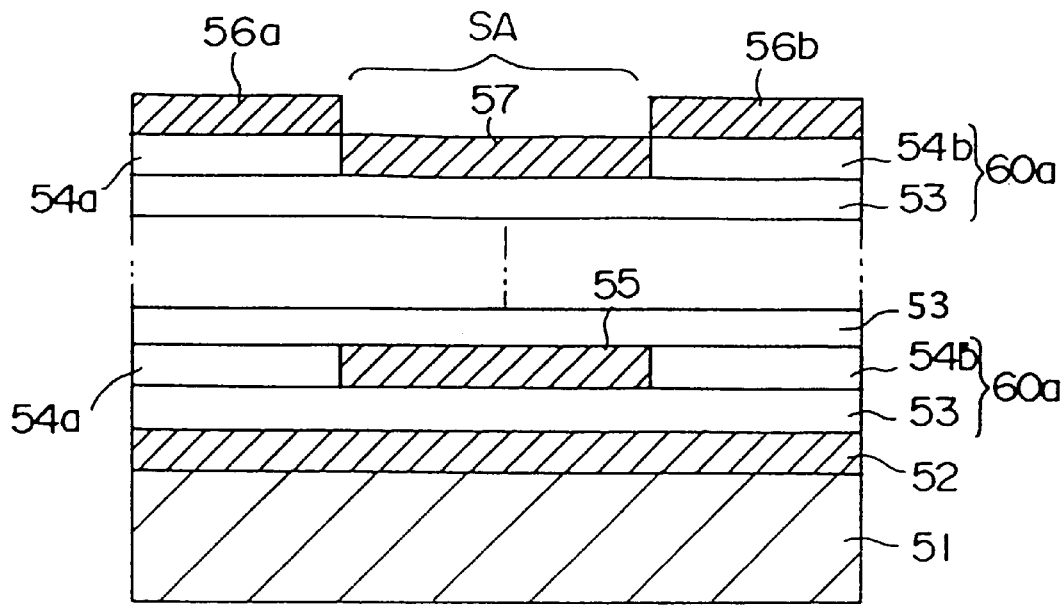
FIGS. 19(a) and 19(b) are side views (No. 1) showing a magnetic recording drive using an artificial lattice type magnetoresistive head according to a fourth embodiment of the present invention.
Figure 19B:
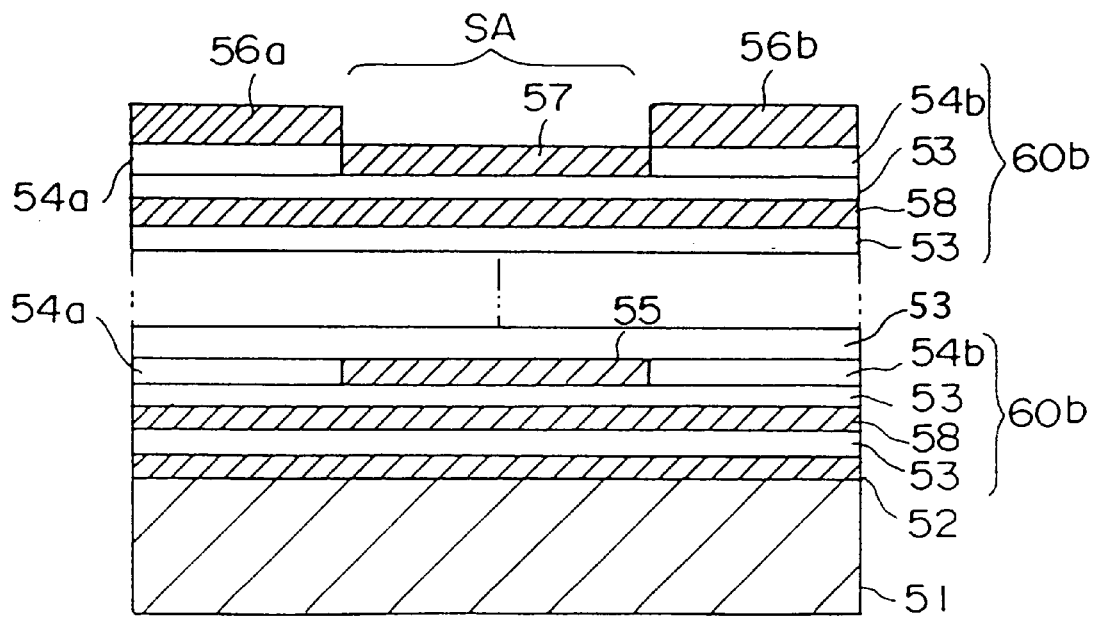

A magnetoresistive head (MR head) according to the fourth embodiment of the present invention is described with reference to FIGS. 19(a) and 19(b). FIGS. 19(a) and 19(b) are cross-sectional views showing a configuration of a magnetoresistive head (MR head) according to the fourth embodiment of the present invention. The difference of the MR head shown in FIGS. 19(a) and 19(b) from those of the second and third embodiments is that a magnetoresistive artificial lattice film is used in place of the anisotropic magnetoresistive film or the spin valve magnetoresistive film.

As shown in FIG. 19(a), a plurality of layered constructions 60a respectively comprising a soft magnetic layer 53 made of an NiFe alloy, a pair of antiferromagnetic layers (or PdMn films) 54a and 54b contacting both ends of a surface of the soft magnetic layer 53 and a nonmagnetic metal layer 55 made of Cu or the like which is packed on the soft magnetic layer 53 between the antiferromagnetic layers 54a and 54b are arranged in series on a ground layer 52 made of Ta which is arranged on a silicon substrate 51. In addition, a pair of electrodes 56a and 56b are arranged on the antiferromagnetic layers 54a and 54b of the uppermost layered construction 60a to lead a sense current to portions of the MR head not placed under a sense region SA, and an insulating protective layer 57 is formed on the soft magnetic layer 53 between the antiferromagnetic layers 54a and 54b of the uppermost layered construction 60a in place of the nonmagnetic metal layer 55.

Therefore, when the intensity of the signal magnetic field is set to zero, the magnetization of the soft magnetic layer 53 can be set in a single magnetizing direction, and the linearity of magnetoresistive characteristics is improved.

In the MR head shown in FIG. 19(a), the antiferromagnetic layers 54a and 54b are arranged on both ends of the soft magnetic layer 53 in each of the layered constructions 60a. However, as shown in FIG. 19(b), it is applicable that a first set of the soft magnetic layer 53 and a non-magnetic metal layer 58 and a second set of the soft magnetic layer 53, the antiferromagnetic layers 54a and 54b and the nonmagnetic metal layer 55 are alternatively arranged. That is, a plurality of layered constructions 60b respectively composed of the first set and the second set are arranged in series. Also, it is applicable that a plurality of layered constructions respectively composed of two or more first sets and the second set may be arranged in series to arrange a group of anti-ferromagnetic layers 54a and 54b every two or more soft magnetic layers 53. Also, it is applicable that one of two soft magnetic layers 53 in each layered construction 60b may be made of Co or the like.

Figure 20A:
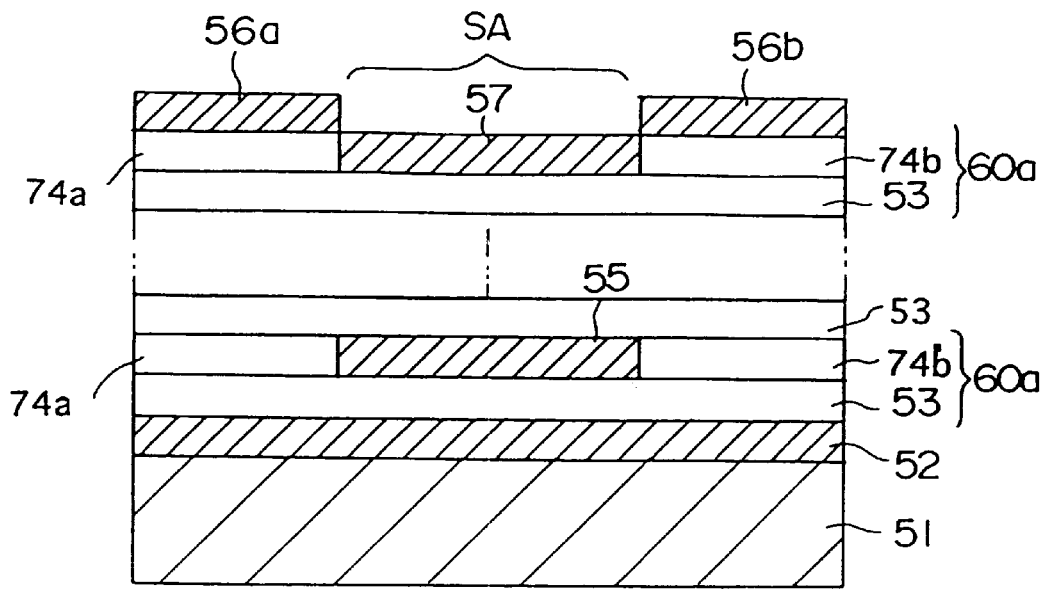
FIGS. 20(a) and 20(b) are side views (No. 2) showing a magnetic recording drive using an artificial lattice type magnetoresistive head according to the fourth embodiment of the present invention.
Figure 20B:
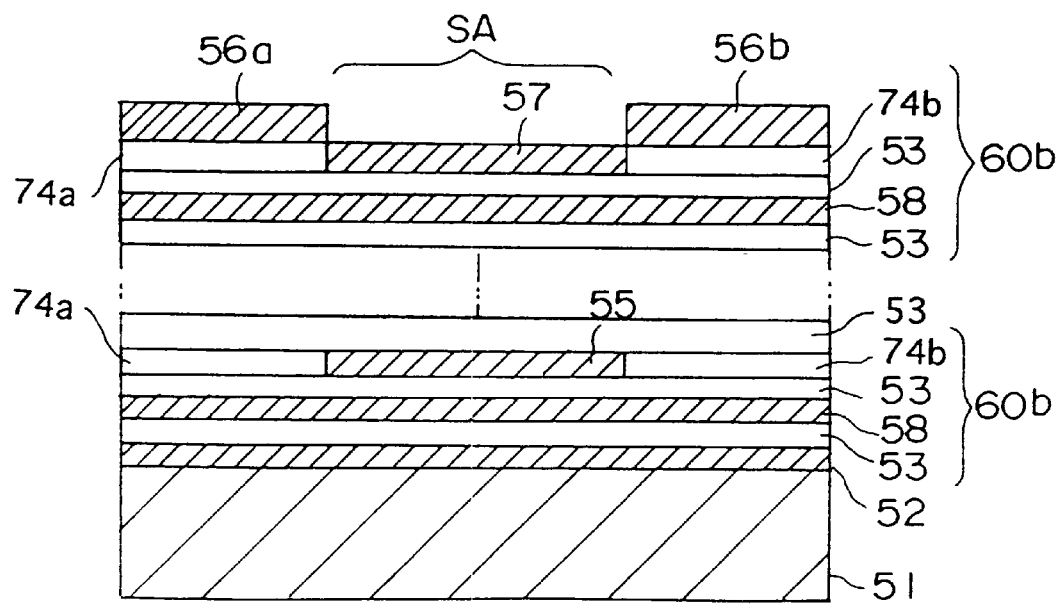

Also, as shown in FIGS. 20(a) and 20(b), it is applicable that a pair of PdPtMn films 74a and 74b be used in place of the antiferromagnetic layers 54a and 54b shown in FIGS. 19(a) and 19(b). In this case, constitutional elements in FIGS. 20(a) and 20(b) which are the same as those in FIGS. 19(a) and 19(b) are designated by the same reference numerals as those in FIGS. 19(a) and 19(b). In this case, the Pt atomic fraction and the Mn atomic fraction can be properly adjusted. Also, the heating process conditions can be properly selected to give the antiferromagnetic property. As a preferred example, a heating process temperature of 230° C. and a heating process time of five hours can be used. Because the heating process temperature for giving the antiferromagnetic property is low, the antiferromagnetic layer having superior corrosion resistance can be formed without degrading the magnetoresistive characteristics of the magneto resistive artificial lattice film.

In the fourth embodiment, Pt is used as a corrosion resistance material added to Pd and Mn. However, other materials such as iridium (Ir), rhodium (Rh), ruthenium (Ru), titanium (Ti), zirconium (Zr) or chromium (Cr) are available.

(5) A fifth embodiment

Figure 21A:
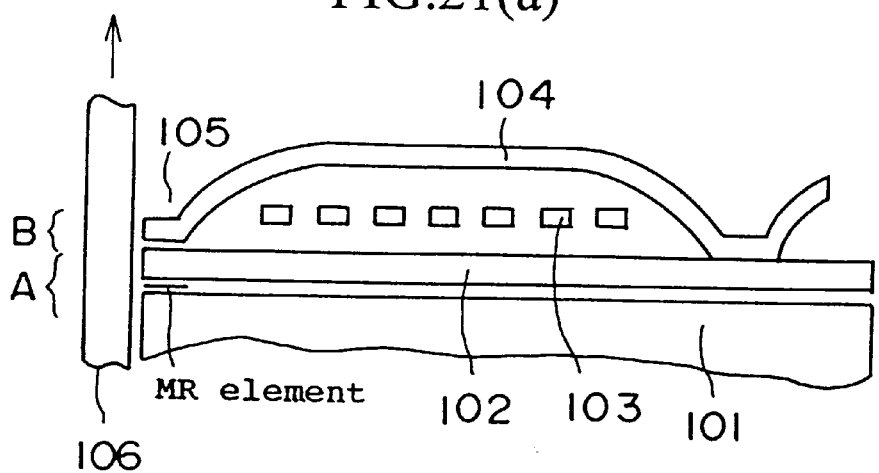
FIG. 21(a) is a cross-sectional view showing an in-gap type MR head according to a fifth embodiment of the present invention.
Figure 21B:
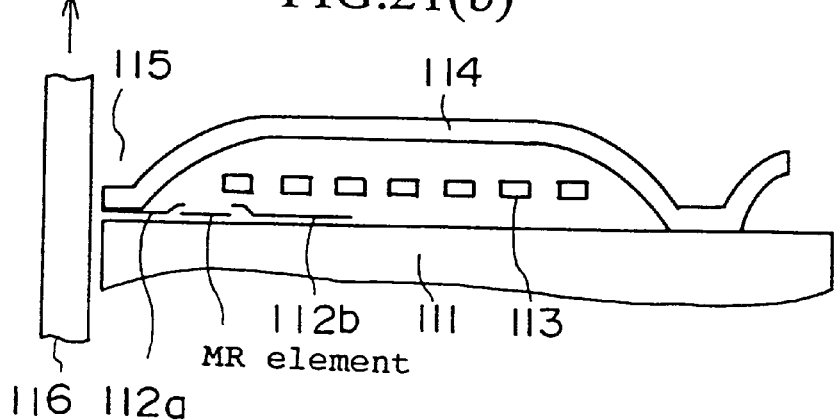
FIG. 21(b) is a cross-sectional view showing a common use type MR head according to the fifth embodiment of the present invention.
Figure 21C:
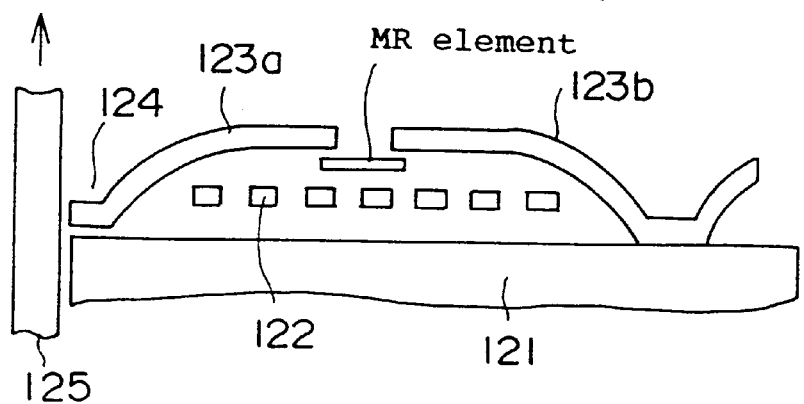
FIG. 21(c) is a cross-sectional view showing a yoke type MR head according to the fifth embodiment of the present invention.

A magnetic recording drive in which the magnetoresistive head (MR head) according to the second to fourth embodiments are used is described with reference to FIGS. 21(a) to 21(c) according to the fifth embodiment of the present invention. FIGS. 21(a) to 21(c) are cross-sectional views showing a magnetic recording drive composed of a magnetic recording medium and a magnetic head.

A combined type MR head is shown in FIG. 21(a). As shown in FIG. 21(a), a combined type MR head comprises are producing head A and a recording head B placed on there producing head A. A soft magnetic layer 102 is used in common as a magnetic shield of the reproducing head A and a magnetic pole of the recording head B. In the producing head A, a soft magnetic layer 101 and the soft magnetic layer 102 face each other with a gap space between the layers 101 and 102. In a facing area 105 of the gap space adjacent to a magnetic recording medium 106, one magnetoresistive head (MR head) according to the second, third or fourth embodiment is placed. A leakage magnetic flux leaking from the magnetic recording medium 106 is directly detected by the MR head, so that recorded information is reproduced in a reproducing unit through the MR head. In the recording head B, a soft magnetic layer 104 and the soft magnetic layer 102 face each other as magnetic poles with a packing space between the layers 104 and 102, and a coil 103 for generating a magnetic flux passing the soft magnetic layers 102 and 104 is arranged in the packing space between the soft magnetic layers 102 and 104. A portion of the magnetic flux generated by the coil 103 leaks from the facing area 105 of the gap space to the magnetic recording medium 106 as a leakage flux, so that information is recorded in the magnetic recording medium 106.

Accordingly, because the magnetoresistive head according to the second, third or fourth embodiment is used in the magnetic recording drive, corrosion resistance of the magnetic recording drive can be heightened, the deterioration of magnetoresistive characteristics of the magnetic recording/reproducing drive can be suppressed, and the reliability of the recording and reproducing operation of the magnetic recording drive can be improved.

An in-gap type MR head having a flux guide is shown in FIG. 21(b). As shown in FIG. 21(b), a pair of soft magnetic layers 111 and 114 face each other as magnetic poles with a gap space between the soft magnetic layers 111 and 114. One magnetoresistive head (MR head) according to the second, third or fourth embodiment is placed in a facing area 115 of the gap space adjacent to a magnetic recording medium 116, and a coil 113 for generating a magnetic flux passing the soft magnetic layers 111 and 114 is arranged in the packing space between the soft magnetic layers 111 and 114.

To avoid corrosion of the magnetoresistive head or to avoid direct contact of the magnetoresistive head with the magnetic recording medium 116, the magnetoresistive head is not exposed from the facing area 115, and the magnetoresistive head is placed in the gap space. A flux guide 112a which is electrically insulated from the MR head and is magnetically connected to the MR head is exposed from the facing area 115 at one side of the MR head. Leakage magnetic flux leaking from the magnetic recording medium 116 passes through the flux guide 112a and is detected by the magnetoresistive head to perform a reproducing operation. Also, another flux guide 112b which is electrically insulated from the MR head and is magnetically connected to the MR head is arranged at the other side of the MR head. Magnetic flux passing through the magnetoresistive head is guided to the soft magnetic layers 111 and 114 by the flux guide 112b.

Accordingly, because the magnetoresistive head according to the second, third or fourth embodiment is used in the magnetic recording drive, corrosion resistance of the magnetic recording drive can be heightened, the deterioration of magnetoresistive characteristics of the magnetic recording drive can be suppressed, and the reliability for the recording and reproducing operation of the magnetic recording drive can be improved.

A yoke type MR head is shown in FIG. 21(c). As shown in FIG. 21(c), a soft magnetic layer 121 and a set of soft magnetic layers 123a and 123b face each other as magnetic poles with a gap space between the soft magnetic layers 121, 123a and 123b, and a coil 122 for generating a magnetic flux passing the soft magnetic layers 121, 123a and 123b is arranged in the packing space between the soft magnetic layers 121, 123a and 123b. One magnetoresistive head (MR head) according to the second, third or fourth embodiment is placed at a spacing area of the gap space between the soft magnetic layers 123a and 123b on condition that the magnetoresistive head is electrically insulated from the soft magnetic layers 123a and 123b and is magnetically connected to the soft magnetic layers 123a and 123b. A magnetic flux which is generated in the coil 122 and passes through the soft magnetic layers 121, 123a and 123b leaks from a facing area 124 of the gap space to a magnetic recording medium 125 as a leakage magnetic flux, and information is recorded in the magnetic recording medium 125.

Accordingly, because the magnetoresistive head according to the second, third or fourth embodiment is used in the magnetic recording/reproducing drive, corrosion resistance of the magnetic recording/reproducing drive can be heightened, the deterioration of magnetoresistive characteristics of the magnetic recording/reproducing drive can be suppressed, and the reliability of the recording and reading operation of the magnetic recording/reproducing drive can be improved.

In the magnetic recording/reproducing drives shown in FIGS. 21(a) to 21(c), a substrate on which a magnetic head is formed and an insulating film placed between a pair of soft magnetic layers are omitted.

Also, the use of the magnetoresistive head according to the second, third or fourth embodiment of the present invention is not limited to the magnetic recording/reproducing apparatus described above. That is, the magnetoresistive head can be used for various types of magnetic recording/reproducing apparatuses which each have a writing unit and a reproducing unit.

Also, the magnetoresistive head can be used for a magnetic recording/reproducing apparatus specialized for a reproducing operation.

As is described above, the PdMn film or the PdPtMn film is used as the anti-ferromagnetic film in the magnetoresistive head according to the present invention. Because the anti-ferromagnetic property can be given to the PdMn film and the PdPtMn film at a low heating process temperature, even though the magnetoresistive head has the NiFe film and the Cu film, the diffusion of Cu into the NiFe film in the heating process can be suppressed, and the deterioration of the magnetoresistive characteristics can be suppressed. Also, because corrosion resistance of the PdMn film is higher than that of the FeMn film and corrosion resistance of the PdPtMn film is higher than that of the PdMn film, the reliability of the magnetoresistive head can be improved.

Also, because the magnetoresistive head according to the present invention is used in the magnetic recording drive, corrosion resistance of the magnetic recording drive can be heightened, the deterioration of magnetoresistive characteristics of the magnetic recording drive can be suppressed, and the reliability of the recording and reproducing operation of the 30 magnetic recording/reproducing drive can be improved.

What is claimed is:

1. A method of manufacturing a magnetoresistive head comprising the steps of:

forming a soft magnetic layer on a nonmagnetic layer;

forming on the soft magnetic layer an antiferromagnetic layer which is made of Pd, Mn and Pt and has an Mn atomic fraction within approximately 48 to 54%; and heating the antiferromagnetic layer at a temperature of higher than approximately 260° C. to improve an antiferromagnetic property.

2. A method of manufacturing a magnetoresistive head according to claim 1 in which the soft magnetic layer is formed of NiFe alloy.

3. A method of manufacturing a magnetoresistive head according to claim 1 in which the antiferromagnetic layer is divided into two pieces which are formed on the soft magnetic layer so as to define therebetween a sense region in the soft magnetic layer.

4. A method of manufacturing a magnetoresistive head according to claim 3 in which the soft magnetic layer and the antiferromagnetic layer define a set, and in which a plurality of said sets are arranged in series in a layered structure.

5. A method of manufacturing a magnetoresistive head according to claim 4 in which a soft magnetic layer and a nonmagnetic metal layer are put between said sets in a layered structure.

6. A method of manufacturing a magnetoresistive head according to claim 1 in which the antiferromagnetic layer, a first soft magnetic layer corresponding to the soft magnetic layer, a nonmagnetic metal layer and a second soft magnetic layer are arranged in that order in a layered structure.

7. A method of manufacturing a magnetoresistive head according to claim 6 in which the antiferromagnetic layer consists of two pieces which are formed on the second soft magnetic layer so as to form therebetween a sense region in the first soft magnetic layer, the nonmagnetic metal layer and the second soft magnetic layer.

8. A method of manufacturing a magnetoresistive head according to claim 1 in which a first soft magnetic layer corresponding to said soft magnetic layer, a nonmagnetic metal layer and a second soft magnetic layer are arranged in that order in a layered structure on said antiferromagnetic layer, whereas another first soft magnetic layer, another nonmagnetic metal layer and another second soft magnetic layer are arranged in that order in a layered structure under said antiferromagnetic layer.

9. A method of manufacturing a magnetoresistive head according to claim 8 in which the first soft magnetic layer, the nonmagnetic metal layer, the second soft magnetic layer, the another first soft magnetic layer, the another nonmagnetic metal layer and the another second soft magnetic layer define a set, and in which a plurality of said sets are arranged in series in a layered structure.

10. A method of a magnetoresistive head according to claim 5 in which said nonmagnetic metal layer is formed of Cu.

11. A method of manufacturing a magnetoresistive head according to claim 1 wherein said antiferromagnetic layer provided with said antiferromagnetic property has a bias magnetic field (Hua).

12. A method of manufacturing a magnetoresistive head according to claim 6 in which said nonmagnetic metal layer is formed of Cu.

13. A method of manufacturing a magnetoresistive head according to claim 7 in which said nonmagnetic metal layer is formed of Cu.

14. A method of manufacturing a magnetoresistive head according to claim 8 in which said nonmagnetic metal layer is formed of Cu.

15. A method of manufacturing a magnetoresistive head according to claim 9 in which said nonmagnetic metal layer is formed of Cu.

* * * * *